(12) United States Patent
Lee et al.

(10) Patent No.: US 9,983,653 B2
(45) Date of Patent: May 29, 2018

(54) CENTRAL CONTROL APPARATUS FOR CONTROLLING FACILITIES, FACILITY CONTROL SYSTEM INCLUDING THE SAME, AND METHOD OF CONTROLLING FACILITIES

(71) Applicant: LG ELECTRONICS INC., Seoul (KR)

(72) Inventors: Junu Lee, Seoul (KR); Kyeungjae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 239 days.

(21) Appl. No.: 14/858,559

(22) Filed: Sep. 18, 2015

(65) Prior Publication Data

US 2016/0103475 A1    Apr. 14, 2016

(30) Foreign Application Priority Data

Oct. 10, 2014    (KR) ........................ 10-2014-0136892

(51) Int. Cl.
  *G06F 1/32*      (2006.01)
  *G05B 19/418*   (2006.01)
  *G05B 19/042*   (2006.01)

(52) U.S. Cl.
  CPC ......... *G06F 1/3206* (2013.01); *G05B 19/042* (2013.01); *G05B 19/41885* (2013.01);
  (Continued)

(58) Field of Classification Search
  CPC ............ G06F 1/3206; G05B 19/41885; G05B 19/042; G05B 2219/2642; G05B 2219/2639
  See application file for complete search history.

(56) References Cited

U.S. PATENT DOCUMENTS 6,591,620 B2 *  7/2003  Kikuchi ................. F24F 11/006
                                              236/51
7,216,021 B2 *  5/2007  Matsubara ................ H02J 3/00
                                              700/22
(Continued)

FOREIGN PATENT DOCUMENTS

CN    102035876    4/2011
CN    102052739    5/2011
(Continued)

OTHER PUBLICATIONS

Korean Office Action for Application 10-2014-0136892 dated Sep. 22, 2015.

(Continued)

*Primary Examiner* — Charles Kasenge
(74) *Attorney, Agent, or Firm* — KED & Associates, LLP

(57) ABSTRACT

A central control apparatus for controlling facilities, a facility control system including the same, and a method of controlling facilities may be provided. The central control apparatus may include a control unit performing control on facilities or equipment. The control unit may include a data collection module configured to collect prediction environment data including weather information of a control target region, a system setting module configured to set information of at least one facility in the control target region, and an energy use amount simulation module configured to model the at least one facility, based on the information of the at least one facility, set at least one control scenario applicable to the at least one facility, and simulate consumption power of the modeled at least one facility that operates according to the at least one control scenario.

17 Claims, 19 Drawing Sheets

(52) U.S. Cl.
CPC ............... *G05B 2219/2639* (2013.01); *G05B 2219/2642* (2013.01); *Y02P 80/114* (2015.11)

(56) References Cited

U.S. PATENT DOCUMENTS

| | | | | |
|---|---|---|---|---|
| 7,225,171 | B2* | 5/2007 | Kikuchi | F24F 11/006 700/276 |
| 7,519,485 | B2* | 4/2009 | MacGregor | G06F 17/5004 702/60 |
| 7,784,706 | B2* | 8/2010 | Ishida | F24F 11/001 236/51 |
| 7,881,889 | B2* | 2/2011 | Barclay | G06F 17/5004 702/60 |
| 8,359,124 | B2* | 1/2013 | Zhou | G05B 13/024 700/276 |
| 8,509,954 | B2* | 8/2013 | Imes | H04L 67/42 700/286 |
| 8,600,561 | B1* | 12/2013 | Modi | F24F 11/0012 219/502 |
| 8,626,344 | B2* | 1/2014 | Imes | H04L 67/42 455/419 |
| 8,855,794 | B2* | 10/2014 | Imes | H04L 67/42 700/278 |
| 8,874,497 | B2* | 10/2014 | Raestik | G05B 19/042 706/21 |
| 8,965,587 | B2* | 2/2015 | Modi | F24F 11/0012 219/502 |
| 9,261,863 | B2* | 2/2016 | Sloop | G05B 15/02 |
| 9,269,062 | B2* | 2/2016 | Dhillon | G06Q 50/06 |
| 9,360,874 | B2* | 6/2016 | Imes | F24F 11/0012 |
| 2005/0096797 | A1* | 5/2005 | Matsubara | H02J 3/00 700/291 |
| 2013/0190940 | A1* | 7/2013 | Sloop | G05B 15/02 700/291 |
| 2013/0238144 | A1* | 9/2013 | Shahapurkar | F24F 11/0009 700/278 |
| 2013/0274940 | A1 | 10/2013 | Wei et al. | |
| 2014/0188571 | A1 | 7/2014 | Han et al. | |
| 2015/0378381 | A1* | 12/2015 | Tinnakornsrisuphap | G05F 1/66 700/276 |

FOREIGN PATENT DOCUMENTS

| | | |
|---|---|---|
| CN | 103136893 | 6/2013 |
| JP | 2556884 B2 | 1/1990 |
| JP | 2007-057139 A | 3/2007 |
| KR | 10-1448453 B1 | 10/2014 |

OTHER PUBLICATIONS

European Search Report issued in Application No. 15184147.5 dated Feb. 4, 2016.
Chinese Office Action dated Aug. 17, 2017 issued in Application No. 201510658154.4.

* cited by examiner

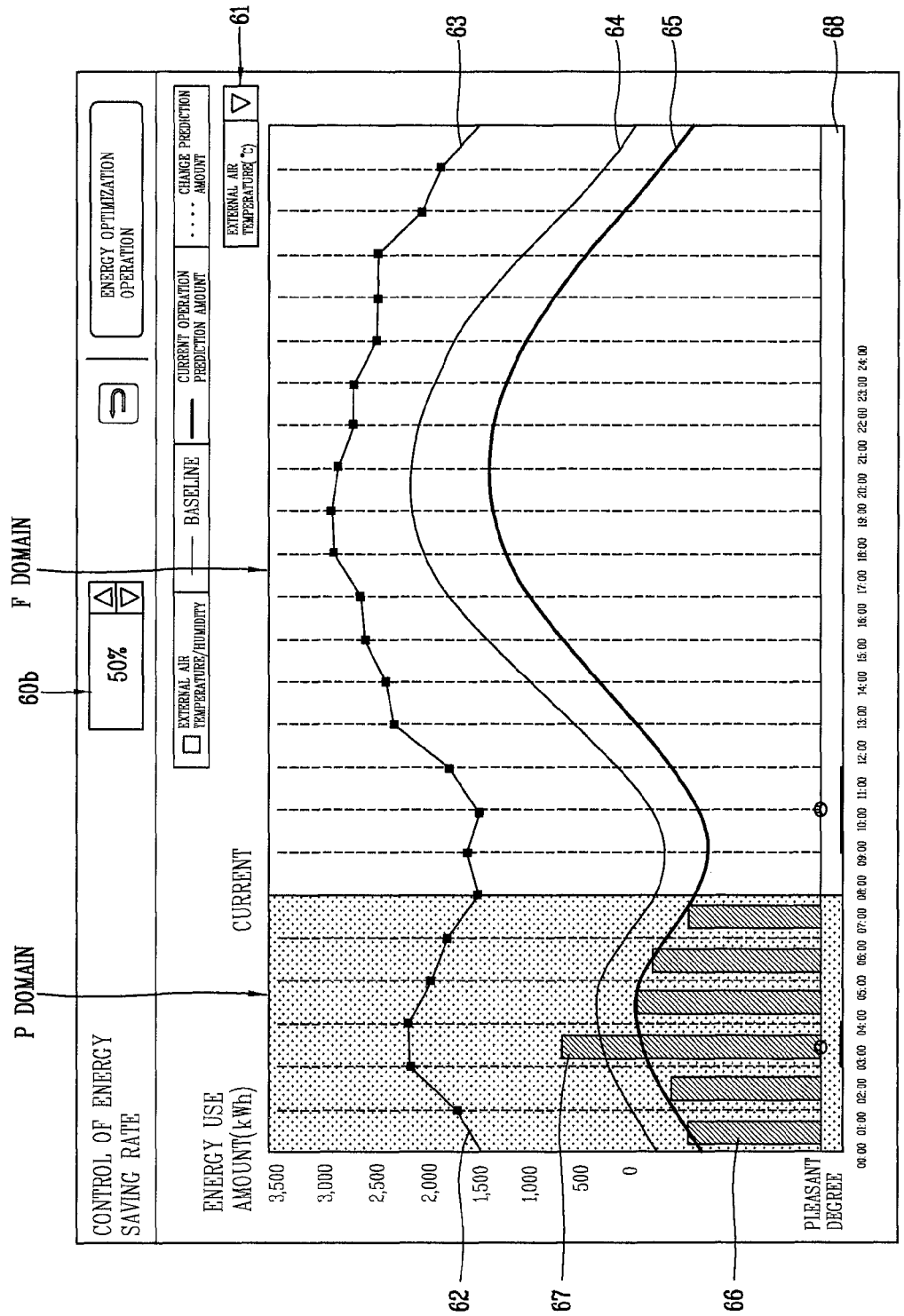

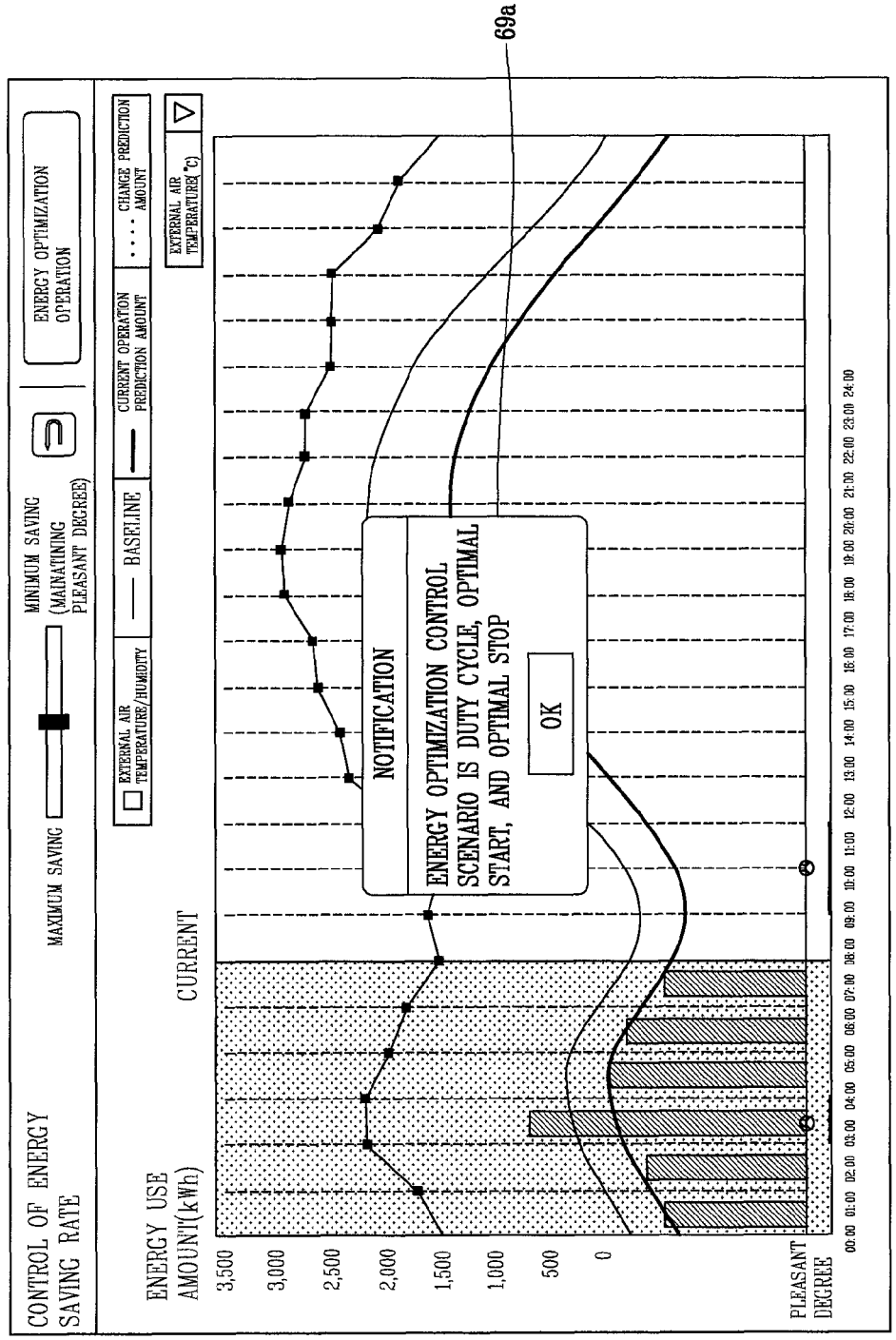

CENTRAL CONTROL APPARATUS FOR CONTROLLING FACILITIES, FACILITY CONTROL SYSTEM INCLUDING THE SAME, AND METHOD OF CONTROLLING FACILITIES

CROSS-REFERENCE TO RELATED APPLICATION

This application claims priority under 35 U.S.C. § 119 to Korean Application No. 10-2014-0136892, filed Oct. 10, 2014, the subject matter of which is incorporated herein by reference.

BACKGROUND

1. Field

The present disclosure relates to a central control apparatus for controlling facilities, a facility control system including the same, and a method of controlling facilities. Embodiments may simulate consumption power of facilities.

2. Background

As facilities of buildings are modernized, an automatic control system for automatically controlling facilities such as power, illumination, air conditioning equipment, anti-crime equipment, and/or the like installed in buildings may be expanded. That is, a facility control system (or a facility control system) for integratedly managing facilities may be actively developed.

A facility control system may be provided based on a watch point (i.e., a control point) for control or monitoring. Therefore, a user (or the like) may set a plurality of control points or a single control point in one facility or equipment and may monitor and control facilities by using a value of a corresponding control point. Therefore, a user may set a corresponding control point depending on kinds and forms of facilities installed in a building, and may register the control point in a facility control system to perform automatic control of the building.

In order to perform energy-saving control on facilities or equipment controlled by a central control apparatus, an expert may analyze driving data of facilities or equipment which is collected through a control point for a certain duration (e.g. a minimum of three months to one year) and construct a control scenario for the facilities or the equipment.

The expert may control driving of the facilities or the equipment according to the constructed control scenario and check whether energy is saved or a degree to which energy is saved, based on a result of the control.

Performing energy-saving control on facilities or equipment may depend on experience or an ability of an expert. For this reason, an energy saving operation or a degree to which energy is saved may not be stably maintained for each of facilities or each of a plurality of control target regions, and much time may be expended in constructing a control scenario for performing energy-saving control.

Technology may be needed for solving the above-described problems.

BRIEF DESCRIPTION OF THE DRAWINGS

Arrangements and embodiments may be described in detail with reference to the following drawings in which like reference numerals refer to like elements and wherein:

FIGS. 7A, 7B, 7C and 7D are exemplary diagrams of a screen output by a central control apparatus according to an exemplary embodiment;

DETAILED DESCRIPTION

Figure 1:
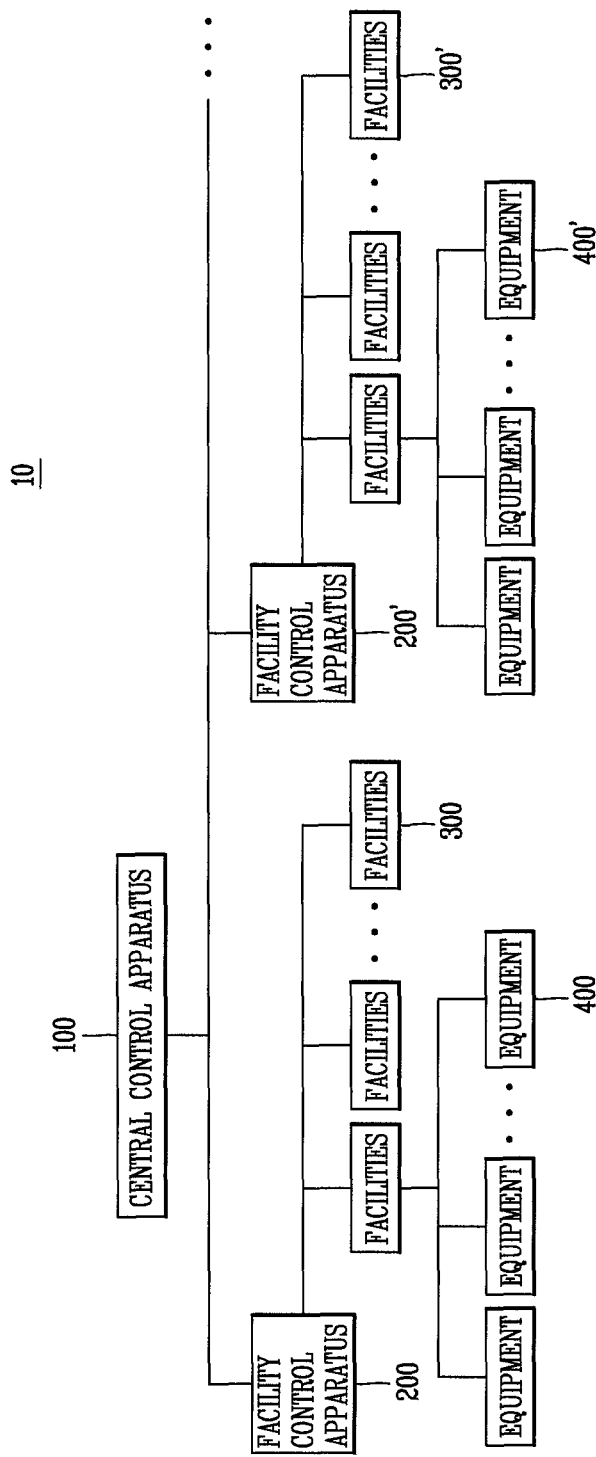
FIG. 1 is a block diagram illustrating a configuration of a facility control system according to an exemplary embodiment.

Description may now be provided in detail of exemplary embodiments, with reference to accompanying drawings. For the sake of brief description with reference to the drawings, same or equivalent components may be provided with the same reference numbers, and description thereof will not be repeated.

Technology disclosed herein may be applied to a central control apparatus (or a central control server) for controlling facilities and a facility control system (or a facility management system) including the same.

The facility control system (or the facility management system) may be a building automation system that is disposed in a building or a tower and controls facilities installed in the building or in the tower. More particularly, the facility control system may be a building management system (BMS). That is, a target to which the facility control system is applied is not limited to the building automation system, and the building automation system may denote a concept including a plant automation system. More particularly, the facility control system may be applied to a building automation system for controlling facilities installed in a building.

The facility control system may be a building energy management system (BEMS) that is used to increase energy performance by managing energy associated with facilities installed in a building to maintain a pleasant indoor environment of the building.

Technology described herein may be applied to a facility control method for controlling facilities installed in a building and may be applied to a facility control system that provides a user interface (UI) for controlling the facilities efficiently and conveniently. The user interface may be provided by a specific apparatus (e.g. a central control apparatus or a central control server) included in the facility control system.

The terminology used herein is for the purpose of describing particular embodiments only and is not intended to be limiting. Unless otherwise defined, all terms used herein have a same meaning as commonly understood by one of ordinary skill in the art to which this disclosure pertains, and should not be interpreted as having an excessively comprehensive meaning nor as having an excessively contracted meaning. If technical terms used herein is erroneous that fails to accurately express the technical idea of the present disclosure, it should be replaced with technical terms that allow the person in the art to properly understand. The general terms used herein should be interpreted according to definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that although the terms including an ordinary number such as first or second are used herein to describe various elements, these elements should not be limited by these terms. These terms are only used to distinguish one element from another element. For example, a first element may be referred to as a second element without departing from the spirit and scope of the present disclosure, and similarly, the second element may also be referred to as the first element.

In describing the present disclosure, if a detailed explanation for a related known function or construction is considered to unnecessarily divert the gist of the present disclosure, such explanation has been omitted but may be understood by those skilled in the art. The accompanying drawings of the present disclosure aim to facilitate understanding of the present disclosure and should not be construed as limited to the accompanying drawings.

Facility Control System

FIG. 1 is a block diagram illustrating a configuration of a facility control system 10 according to an exemplary embodiment. Other embodiments and configurations may be provided.

As illustrated in FIG. 1, the facility control system 10 according to an exemplary embodiment may include a central control apparatus 100 (or central control system) and a plurality of facility control apparatuses 200 and 200' that are connected to the central control apparatus 100 over a communication network. The facility control system 10 may further include one or more facilities 300 and 300' or one or more equipment 400 and 400'.

The central control apparatus 100 may register one or more control points for the one or more facilities 300 and 300' or the one or more equipment 400 and 400' and may control the one or more facilities 300 and 300' or the one or more equipment 400 and 400' by using the one or more control points.

The central control apparatus 100 may include one or more stations (or a virtual server) that are generated by registering at least some of the one or more control points, and each of the one or more stations may be configured to control facilities for the registered some control points according to a control command that is input through a user input.

Each of the facilities 300 and 300' is a sub-system configuring the facility control system 10 and may denote an air conditioner, a ventilator, air conditioning equipment, a boiler, a cooling tower, a pump, a temperature/humidity sensor, a refrigerator, an illumination device, power equipment, an anti-firing system, and/or the like, for example.

When a cooling tower system is provided as a facility, the equipment 400 and 400' may denote a cooling tower, a pump, a refrigerator, a temperature sensor, and/or the like, for example.

The central control apparatus 100 may be an apparatus for integratedly controlling and/or monitoring a whole situation of a building and may include a plurality of separate terminals for the facilities 300 and 300' such as machinery facilities, illumination, power, entrance control, disaster prevention, parking management, facility management, and/or the like, for example.

The central control apparatus 100 may share information with the facility control apparatus 200 through network communication and may be an automation server that controls or monitors the facilities 300 and 300' and the equipment 400 and 400' included therein through a control point.

The central control apparatus 100 may register one or more predetermined control points in the facilities 300 and 300' or the equipment 400 and 400' and may generate a control program that drives the facilities 300 and 300' or the equipment 400 and 400' by using the one or more control points.

The central control apparatus 100 may control and/or monitor the facilities 300 and 300' by using the control program.

According to an exemplary embodiment, the central control apparatus 100 may collect information about facilities installed or disposed in a control region based on a facility drawing, for efficiently controlling the control region included in a building and may control the facilities, based on the collected information.

The central control apparatus 100 may receive a user input through a drawing including a graphic object corresponding to the facilities and may provide an input/output screen or a user interface that outputs a control processing operation or a control processing result for the facilities based on the user input.

As described above, a user can efficiently and intuitively manage facilities by providing the facilities or equipment based on a facility drawing.

The control region may denote a control region of interest (ROI) and a control target region included in a building or a tower. For example, the control region may be an arbitrary space or an arbitrary floor included in the building or the tower.

The building or the tower may denote a building structure that is a control target and may be a shop, a convenience store, a store, a house, an office, an officetel, a plant building, an educational institute, a hospital, and/or the like.

The facility control apparatus 200 may be disposed between the central control apparatus 100 and the one or more facilities 300 and 300' and may execute a control program received from the central control apparatus 100.

That is, the facility control apparatus 200 may be a direct digital controller or a programmable logic controller (PLC) for controlling the facilities 300 and 300'.

The facility control apparatus 200 may exchange information in communication with the central control apparatus 100 and may receive and execute the control program or a control command based on the control program to control the facilities 300 and 300'.

The facility control apparatus 200 may record or store facility-related information such as a control output and a state change of facilities in a building through a control point that is set in the one or more equipment 400 and 400' (e.g. a plurality of sensors and a plurality of manipulation devices) included in the facilities 300 and 300'.

The facility control apparatus 200 may be, for example, a microcomputer that controls or monitors the facilities 300 and 300' and the equipment 400 and 400' according to the control program. In other words, the facility control apparatus 200 may be connected to the central control apparatus 100 over the communication network and may transmit or receive necessary information to or from the central control apparatus 100. Therefore, the facility control apparatus 200 may monitor or control a plurality of control points for air conditioning equipment or other facilities installed in a building and may directly control an input/output signal of the facilities 300 and 300' or the equipment 400 and 400' by using a function built into each of the control points.

The facility control apparatus 200 may be connected between the central control apparatus 100 and the one or more facilities 300 and 300' and may receive and execute a control program or a control command based on the control program.

The facility control apparatus 200 may transmit a result of the execution to the central control apparatus 100. The central control apparatus 100 may include a communication unit (or communication device) as a means that transmits the control program or the control command based on the control program to the facility control apparatus 200 and receives, from the facility control apparatus 200, a result of execution for the control program or the control command based on the control program.

The central control apparatus 100 may include a display unit (or display device) as a means for displaying the execution result on a user screen.

The central control apparatus 100, the facility control apparatus 200, and the facilities 300 and 300' may be connected to each other over the communication network.

According to an exemplary embodiment, the communication network may include various communication protocols.

For example, the central control apparatus 100, the facility control apparatus 200, and the facilities 300 and 300' may be connected to each other through a transmission control protocol/Internet protocol (TCP/IP) and a building automation and control network (BACnet).

Examples of the communication protocols may include controller area network (CAN), DeviceNet, Profibus, Interbus, LonWorks, and/or the like. The LonWorks may be easily connected to the Internet by using the open system interconnection (OSI) 7 layer and may be monitored and controlled over the Internet. Accordingly, the LonWorks may be variously applied, and an importance of the LonWorks may progressively expanded.

Central Control Apparatus

Figure 2:
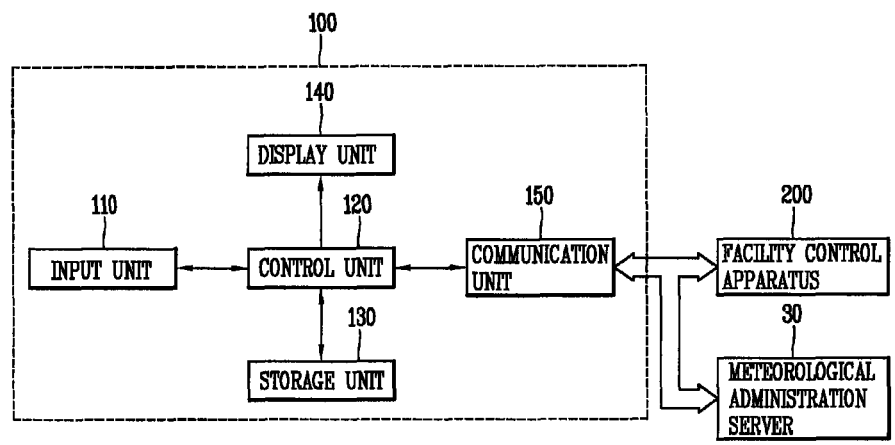
FIG. 2 is a block diagram illustrating a configuration of a central control apparatus according to an exemplary embodiment.

FIG. 2 is a block diagram illustrating a configuration of a central control apparatus according to an exemplary embodiment. Other embodiments and configurations may also be provided.

As illustrated in FIG. 2, the central control apparatus 100 according to an exemplary embodiment may include a control unit 120 (or controller) that controls facilities 300 and 300' or equipment 400 and 400'. The central control apparatus 100 may further include at least one of an input unit 110 (or input device), a storage unit 130 (or storage), a display unit 140 (or a display device), and a communication unit 150 (or communication device).

Since the elements illustrated in FIG. 2 are not essential, the central control apparatus 100 that includes elements which are less than or more than the number of the elements illustrated in FIG. 2, may be implemented and the central control apparatus 100 may further include various elements that simulate consumption power of facilities or equipment to be controlled or provide a user interface related thereto.

The elements of the central control apparatus 100 may now be described in detail.

The input unit 110 (or input device) may be a means that receives a user input for controlling the central control apparatus 100, and a user may generate, through the input unit 110, input data for controlling an operation of the central control apparatus 100.

The input unit 110 may include a keypad, a dome switch, a touch pad (e.g. a contact capacitive type or a press resistive type), a jog wheel, a jog switch, and/or the like. The touch pad may be a touch screen that forms a layer structure with the display unit 140.

For example, the input unit 110 may receive a setting input for setting an environment or a parameter associated with hardware or software included in the central control apparatus 100 or for performing a specific function of the central control apparatus 100.

According to an exemplary embodiment, as described below, the specific function performed by the central control apparatus 100 may be a function of simulating the amount of used energy, a function of determining a combination of one or more control scenarios based on an input energy saving rate, a function of correcting or setting a control scenario, and/or a function of controlling facilities or equipment, and/or the like.

The input unit 110 may receive a control input for controlling facilities or equipment installed in a control target region to be controlled.

According to an exemplary embodiment, the input unit 110 may, receive a user input through a user interface that the central control apparatus 100 provides to a user. The user interface may be a graphic user interface.

For example, the input unit 110 may receive a control input through a graphic object that represents state information of facilities, consumption power of the facilities, and/or an energy saving rate that may be described below.

For example, when the user clicks or touches the graphic object displayed on a screen, the control unit 120 may set a specific value such as the energy saving rate in response to an input received through the input unit 110, and may determine a control scenario combination according to the specific value or perform an operation of controlling facilities or equipment according to the control scenario combination. The control unit 120 may display a performing process or a result of performance on a screen of the display unit 140.

The graphic object may be various graphs, icons, or indicators included in the screen displayed by the display unit 140.

The control unit 120 (or controller) may be a means that controls an element included in the central control apparatus 100 or elements connected to the central control apparatus 100.

The control unit 120 may control the facilities 300 and 300' or the equipment 400 and 400' according to a predetermined combination of one or more control commands or may receive monitoring data of the facilities 300 and 300' or the equipment 400 and 400'.

The control unit 120 may control facilities disposed in the specific region through the facility control apparatus 200 that communicates with the central control apparatus 100 in a specific communication scheme.

The specific communication scheme may be at least one of the TCP/IP, the BACnet, and the LonWorks.

The facility control apparatus 200 may be at least one of the direct digital controller and the PLC.

Figure 3:
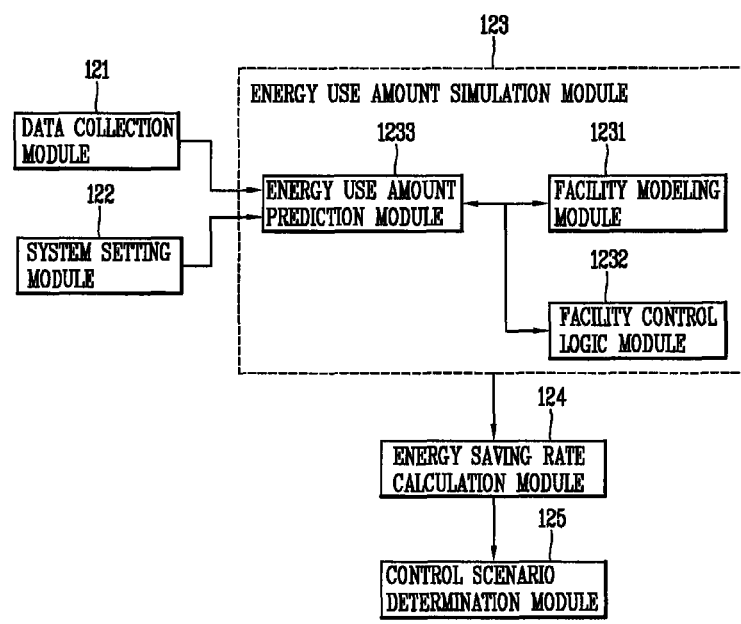
FIG. 3 is a block diagram illustrating a configuration of a function-based module unit according to an exemplary embodiment.

FIG. 3 is a block diagram illustrating a configuration of a function-based module unit according to an exemplary embodiment. Other embodiments and configurations may also be provided.

As illustrated in FIG. 3, the control unit 120 may include a data collection module 121 (or data collection device), a system setting module 122 (or system setting device), and an energy use amount simulation module 123 (or energy use amount simulation device).

The data collection module 121 may collect prediction environment data that includes weather information about a control target region, and/or may collect state information about facilities or equipment through a control point.

The data collection module 121 may receive, from a meteorological administration server 30, environment data that includes various pieces of weather information such as a temperature and humidity, predict environment data including weather information by using various algorithms, and/or read environment data that is stored in the storage unit 130 and includes weather information, thereby collecting current real-time environment data and/or prediction environment data corresponding to an arbitrary future time.

The real-time environment data and/or the prediction environment data may be data of an area including the control target region.

The data collection module 121 may collect (or obtain) state information of the facilities 300 and 300' or the equipment 400 and 400' from the control point through the communication unit 150.

The system setting module 122 may set information about at least one facility in the control target region.

The system setting module 122 may receive information of facilities that is received from a user or is read from various storage mediums, and/or may supply the received information to the energy use amount simulation module 123.

The information of the facilities may be information necessary for modeling the facilities and may include specifications of the facilities such as configurations, capacities, kinds, and/or the like of the facilities. Various pieces of information about the facilities may further include relationship information of a connection with other facilities, such as the kind of a facility connected to another facility, the number of the facilities, a combination of the facilities, and/or the like.

Therefore, the energy use amount simulation module 123 may model the facilities, based on the information of the facilities and may simulate consumption power of the modeled facilities according to a control scenario.

The system setting module 123 may supply, to the energy use amount simulation module 123, the control scenario for the facilities 300 and 300' or the equipment 400 and 400' in addition to the information of the facilities.

The system setting module 122 may supply the control scenario, which is input from a user or is read from various storage mediums, to the energy use amount simulation module 123.

The control scenario may be a set of one or more control commands having a specific order. That is, the control scenario may be a set of control commands for controlling the facilities 300 and 300' or the equipment 400 and 400', and as a detailed example, may be an optimal turn-on/off control operation, a setting temperature control operation, a duty control operation, and/or the like.

Detailed examples of a control scenario may now be described in detail.

Figure 5A:
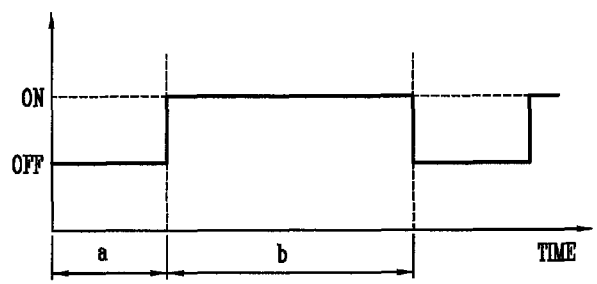
FIG. 5A is a diagram illustrating a driving time of a facility based on duty control.

FIG. 5A is a diagram illustrating a driving time of a facility based on duty control.

The duty control operation may control a turn-on/off period of facilities or equipment. As illustrated in FIG. 5A, the duty control operation may control a rate (=b/a+b) of a turn-on time "b" where the facilities or the equipment operate during one period where the facilities or the equipment perform a turn-on/off operation.

For example, when a facility is an air conditioning device, the air conditioning device may perform a turn-on/off driving operation according to a duty rate that is set based on a setting temperature or a space load.

The control unit 120 may control driving of facilities or equipment according to a varied duty rate suitable for a situation, based on state information (or environment information) about a control target region or an external and/or internal load of the control target region, thereby enhancing an energy saving rate of the facilities or the equipment.

Figure 5B:
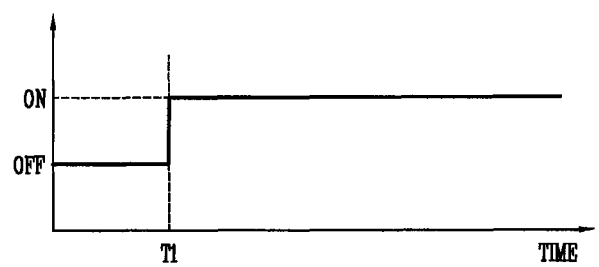
FIGS. 5B(a) and 5B(b) are diagrams, illustrating a driving time of a facility based on optimal turn-on/off control.
Figure 5B:
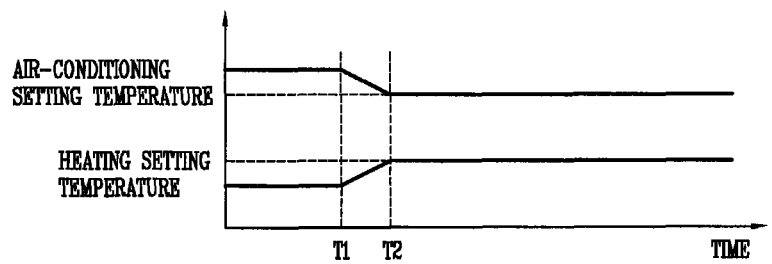

FIG. 5B is a diagram illustrating a driving time of a facility based on optimal turn-on/off control.

The optimal turn-on/off control operation may operate and control facilities or equipment before a predetermined driving time of the facilities or the equipment, based on a setting temperature of a control target region and a current temperature of the control target region, thereby saving energy.

As illustrated in FIG. 5B(a), facilities may start to operate at a T1 time. In this example, as shown in FIG. 5B(b), the T1 time is an earlier time than a T2 time that is a room time of the control target region. The control unit 120 may calculate an optimal condition of previously controlling the turn-on/off of the facilities before the T2 time, based on the setting temperature of the control target region and the current temperature of the control target region and may control the turn-on/off of the facilities, thereby saving energy.

Figure 5C:
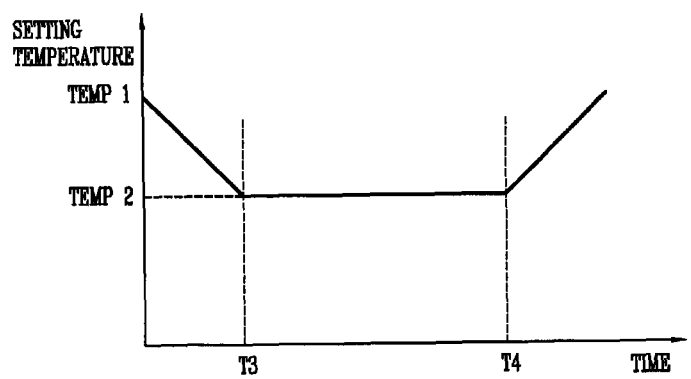
FIGS. 5C(a) and 5c(b) are diagrams illustrating a setting temperature control operation based on a load of a control target region.
Figure 5C:
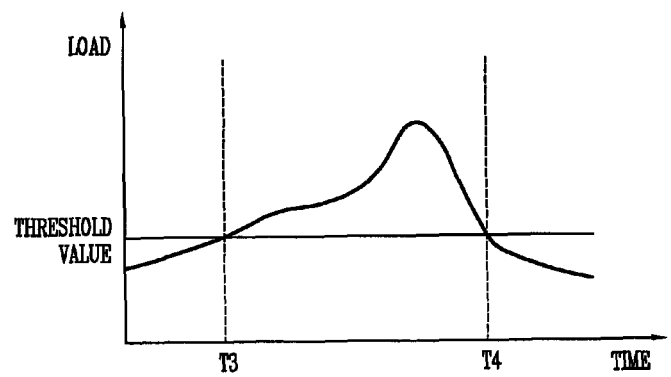

FIG. 5C is a diagram illustrating a setting temperature control operation based on a load of a control target region.

The setting temperature control operation may perform control to change a setting temperature according to a space load of the control target region.

As illustrated in FIG. 5C(b), a space load (or an internal load) of a control target region may increase in amount of generated heat (for example, an operation of an electric heater, an increase in the number of persons in the control target region, and/or the like) at a T3 time to a T4 time and thus may have a threshold value. In a facility that performs air conditioning on the target control region, the setting temperature control operation may lower and set a setting temperature of the control target region to Temp2 at the T3 time to the T4 time.

As described above, in a facility that performs air conditioning, a setting temperature may be set according to a space load (or an internal load), and a necessary load may be supplied to or removed from a control target region, thereby saving energy used by the facility.

In a facility or equipment that is controlled according to a control scenario, when the facility or the equipment is a facility or equipment that performs air conditioning, a pleasant degree of a control target region may be controlled to within a predetermined pleasure-degree range.

A pleasant degree may be described below in detail.

Figure 6:
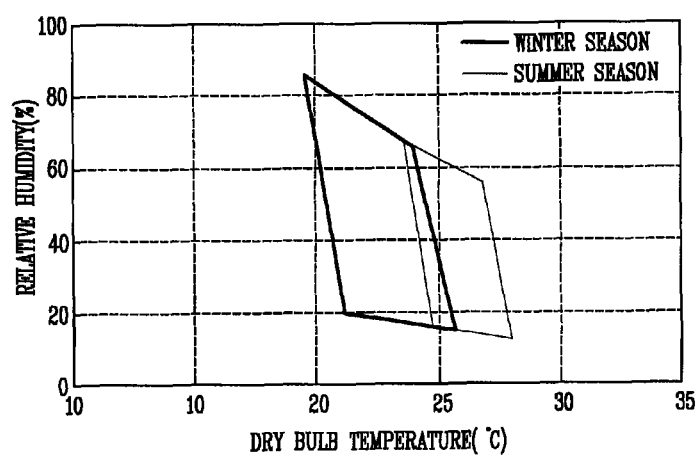
FIG. 6 is an exemplary diagram of a season-based pleasant region.

FIG. 6 is an exemplary diagram of a season-based pleasant region.

A pleasant degree may be a pleasant indicator calculated by predicted mean vote, predicted percentage dissatisfied (PMV, PPD) which is defined in American society of heating, refrigerating and air-conditioning engineers (ASHRAE) Standard 55-2010 that is standard for an indoor heat environment among standards presented by ASHRAE.

The pleasant degree may be calculated (or determined) based on a variable of each of an air temperature, a radiant temperature, a relative humidity, an air speed, an activity level (Met.), and a clothing quantity (CLO), for example.

In a pleasant degree, when PPD is lower than 10% according to a predetermined reference, it may be evaluated that a control target region is pleasant, and when PPD is equal to or higher than 10% and is lower than 25%, it may be evaluated that a pleasant degree of the control target region is normal. Also, when PPD is higher than 25%, it may be evaluated that a pleasant degree of the control target region is unpleasant.

For example, reference values for setting a season-based pleasant region may be shown in the following Table 1.

When the reference values listed in Table 1 is expressed as a graph with a dry bulb temperature and a relative humidity as variables, the reference values may be expressed as shown in FIG. 6.

The energy use amount simulation module 123 may include a facility modeling module 1231, a facility control logic module 1232, and an energy use amount prediction module 1233, for example.

The facility modeling module 1231 may model facilities, based on information of the facilities supplied from the system setting module 122.

That is, the facility modeling module 1231 may model elements included in the facilities, based on the information of the facilities and may model the amount of heat (e.g. a temperature of fluid moving between the elements, a flow rate, and/or the like) that is input and/or output between the elements, thereby modeling the facilities.

Figure 4A:
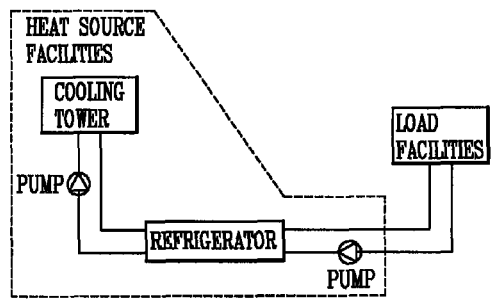
FIG. 4A is a diagram illustrating a configuration of a facility which is a cooling tower system.
Figure 4B:
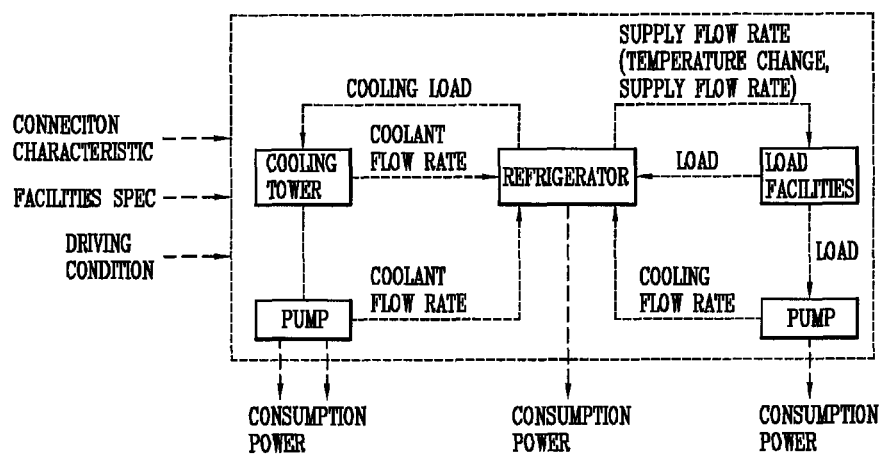
FIG. 4B is a diagram illustrating a modeled configuration of the facility illustrated in FIG. 4A.

As a detailed example, FIG. 4A is a diagram illustrating a configuration of a facility that is a cooling tower system, and FIG. 4B is a diagram illustrating a modeled configuration of the facility illustrated in FIG. 4A.

As illustrated in FIG. 4A, the cooling tower system may include a heat source facility that generates heat for a load facility, which is a heat load processed by the heat source facility, with energy.

Examples of the heat source facility may include a cooling tower, a refrigerator, a pump disposed between the cooling tower and the refrigerator, and a pump disposed between the load facility and the refrigerator. When the heat source facility is modeled, a configuration of the modeled heat source facility may be illustrated in FIG. 4B.

That is, as illustrated in FIG. 4B, the cooling tower system may be modeled based on a temperature of coolant that is supplied from the refrigerator to the cooling tower, a cooling load of the cooling tower, a flow rate of the coolant by the pump disposed between the cooling tower and the refrigerator, the amount of heat (a temperature change and a supply flow rate) that is supplied from the refrigerator to the load facility, the amount of heat (a load) that the load facility requests from the refrigerator, a cooling flow rate between the refrigerator and the pump by the pump disposed between the load facility and the refrigerator, and a pressure difference (a load) between the load facility and the pump.

A method of performing modeling on facilities 300 and 300' or equipment 400 and 400' may use various methods known to those skilled in the art.

As described above, a facility modeled by the facility modeling module 1231 may be supplied to the energy use

TABLE 1

| Run # | Air Temp. °F. | Air Temp. °C. | RH % | Radiant Temp. °F. | Radiant Temp. °C. | Air Speed FPM | Air Speed m/s | Met. | CLO | PMV | PPD % |
|---|---|---|---|---|---|---|---|---|---|---|---|
| 1 | 67.3 | 19.6 | 86 | 67.3 | 19.6 | 20 | 0.10 | 1.1 | 1 | −0.5 | 10 |
| 2 | 75.0 | 23.9 | 66 | 75.0 | 23.9 | 20 | 0.10 | 1.1 | 1 | 0.5 | 10 |
| 3 | 78.2 | 25.7 | 15 | 78.2 | 25.7 | 20 | 0.10 | 1.1 | 1 | 0.5 | 10 |
| 4 | 70.2 | 21.2 | 20 | 70.2 | 21.2 | 20 | 0.10 | 1.1 | 1 | −0.5 | 10 |
| 5 | 74.5 | 23.6 | 67 | 74.5 | 23.6 | 20 | 0.10 | 1.1 | 0.5 | −0.5 | 10 |
| 6 | 80.2 | 26.8 | 56 | 80.2 | 26.8 | 20 | 0.10 | 1.1 | 0.5 | 0.5 | 10 |
| 7 | 82.2 | 27.9 | 13 | 82.2 | 27.9 | 20 | 0.10 | 1.1 | 0.5 | 0.5 | 10 |
| 8 | 76.5 | 24.7 | 16 | 76.5 | 24.7 | 20 | 0.10 | 1.1 | 0.5 | −0.5 | 10 |

That is, in winter season, regions corresponding to #1 to #4 may be set to pleasant regions, and in summer season, regions corresponding to #5 to #8 may be set to pleasant regions.

amount prediction module 1233, and the energy use amount prediction module 1233 may simulate the amount of used energy by using the modeled facility.

That is, the energy use amount prediction module 1233 may determine an input variable as one of the kinds of facilities, capacities of the facilities, a connection relationship with other facilities, and driving conditions of the facilities by using the modeled facility, and thus, an output variable of the modeled facility may be consumption power of the modeled facility.

The driving conditions of the facilities may include at least one or a combination of an external load, an internal load, and a start time of facilities, for example.

For example, as illustrated in FIG. 4B, when an input variable is used as at least one or a combination of a connection relationship with other facilities, aspects of facilities, and driving conditions of the facilities, by using the modeled cooling tower system, the energy use amount prediction module 1233 may calculate consumption power and driving coefficient of performance (COP) of a refrigerator, calculate consumption power and a supply flow rate of a pump, and calculate consumption power and a coolant supply temperature of a fan for a cooling tower.

That is, by using a modeled facility and a space load (or an internal load), the control unit 120 may calculate a relationship between at least one piece of prediction environment data of a control target region and the amount of power consumed by the modeled facility. As described above, the prediction environment data may be environment data, including various pieces of weather information such as a temperature and a humidity of the inside and/or the outside of a control target region, which is received from the meteorological administration server 30 through the communication unit 150.

When simulating consumption power of the modeled facility, the energy use amount prediction module 1233 may simulate the modeled facility for each of a plurality of control target regions or with regard to time.

That is, when a control target region is provided in plurality, the control unit 120 may calculate a relationship between the prediction environment data and the amount of the consumed power for each of the plurality of control target regions.

By calculating consumption power of facilities with regard to time, the consumption power of the facilities may be predicted for a specific time.

In terms described herein, the space load may denote the internal load corresponding to the external load. The external load may be expressed as the amount of heat based on the environment data (including a temperature, a humidity, and/or the like) received from the meteorological administration server 30, and the space load may be calculated by various means known to those skilled in the art. However, according to an exemplary embodiment, as expressed in the following Equation (1), the space load may be calculated by using a thermal equilibrium equation expressed based on heat transfer modeling for a control target region.

$$\rho c_p V_z \frac{dT_z}{dt} = \sum \beta h_{i-envelop} A_{envelop}(T_{i-envelop} - T_z) + \sum U_{win} A_{win}(T_{amb} - T_z) + \sum q''_{sol} \lambda_{shgc} A_{win} + \dot{m}_{sys} c_p (T_{sys} - T_z) + \dot{m}_{inf} c_p (T_{amb} - T_z) + q_{sens,outer} \quad (1)$$

where $\rho$ denotes a density (kg/m$^3$), cp denotes specific heat (W/(kgK)), V denotes volume (m$^3$), T denotes a temperature (K), h denotes a heat transfer coefficient, U denotes an integration heat transfer coefficient (W/(m$^2$K)), A denotes an area (m$^2$), q"sol denotes the amount of solar radiation per unit area (W/m$^2$), $\lambda$shgc denotes a shading coefficient of a window, $\dot{m}$ denotes a mass flow rate (kg/s), and qsens denotes an internal heating valve (W).

The thermal equilibrium equation expressed in Equation (1) may be established by using a first heat amount based on a temperature change rate in a control target region and a second heat amount based on a change amount of heat that is input to or output from the control target region.

In this case, as expressed in Equation (1), the second heat amount may include the amount of heat that is transferred through an external skin according to a change in an indoor or outdoor temperature, the amount of heat that is transferred through a window according to a change in an indoor or outdoor temperature, a change amount of heat based on direct solar radiation passing through the window, a change amount of heat which is supplied and removed by an air conditioning device 310, a change amount of heat based on air (air that penetrates into the inside through a gap of an external skin, a window, and/or the like, or penetrates into the inside when opening or closing a door) that directly penetrates into the inside, and the amount of heat generated in the inside (for example, the amount of heat generated by a human body, illumination, various heating material, and/or the like) in sequence from a first term.

When calculating an indoor heat amount included in the second heat amount, the indoor heat amount may include the amount of human-body heat based on the number of in-room persons in a control target region.

The amount of human-body heat may be calculated by arithmetically multiplying the amount of human-body heat per person by the number of in-room persons. However, in other exemplary embodiments, the amount of human-body heat may be calculated by using the amount of human-body heat that is based on the number of the in-room persons and is stored in a storage means, based on the number of in-room persons calculated from the control target region:

In a thermal equilibrium equation for the control target region, a certain region, which is disposed from at least one side of an external skin to an inner side, may be classified as an outer circumference portion, and a region other than the outer circumference portion may be classified as an inner circumference portion. The control unit 120 may calculate a space load, based on a thermal equilibrium equation for each of the outer circumference portion and the inner circumference portion.

The control unit 120 may calculate the space load by using the prediction environment data that is received from the meteorological administration server 30 through the communication unit 150.

As described above, the energy use amount prediction module 1233 may simulate the amount of power consumed by a modeled facility that operates according to a predetermined control scenario, based on information about facilities.

In order to calculate the amount of energy used by a modeled facility, as described above, a driving condition may include at least one of or a combination of an external load, an internal load, and a start time of facilities.

In order for the energy use amount prediction module 1233 to calculate the amount of power consumed by a modeled facility that operates according to a predetermined control scenario, the facility control logic module 1232 may set at least one control scenario applicable to facilities and may supply the at least one control scenario to the energy use amount prediction module 1233.

As described above, the system setting module 122 may supply a control scenario, which is input from a user or is read from various storage mediums, to the energy use amount simulation module 123.

The facility control logic module 1232 may select a control scenario, which is applicable to a facility of which consumption power is to be simulated, from among a plurality of control scenarios supplied from the system setting module 122.

The facility control logic module 1232 may select at least one scenario from among the plurality of control scenarios supplied from the system setting module 122, based on a facility modeled by the facility modeling module 1231 or may select at least one scenario from among the plurality of control scenarios, based on the specification and/or the like of facilities supplied by the system setting module 122.

Therefore, when a facility modeled by the facility modeling module 1231 operates according to at least one control scenario selected by the facility control logic module 1232, the energy use amount prediction module 1233 may simulate consumption power of the modeled facility.

A time, for which the energy use amount prediction module 1233 simulates consumption power of a modeled facility, may be a predetermined arbitrary time or a predetermined arbitrary period. However, in other exemplary embodiments, the energy use amount prediction module 1233 may receive prediction environment data, which is collected for twenty-four hours of a corresponding day, from the meteorological administration server 30 at midnight (00:00) and may simulate the consumption power of the modeled facility by using the received prediction environment data.

According to an exemplary embodiment, the control unit 120 may further include an energy saving rate calculation module 124 that calculates an energy saving rate of a modeled facility or a control target region, based on a simulation result of consumption power of the modeled facility that operates according to a combination of one or more control scenarios.

The energy saving rate calculation module 124 may calculate an energy saving rate by using a rate of the amount of consumption power of a modeled facility that operates according to a combination of one or more control scenarios calculated by the energy use amount simulation module 123, based on the amount of energy (herein referred to as a baseline) used by facilities or equipment that do not perform an energy saving control operation.

The energy saving rate calculation module 124 may calculate a relationship between an energy saving rate (or the amount of consumption power) of facilities or equipment and a combination of one or more control scenarios.

According to an exemplary embodiment, when a modeled facility or equipment operates according to a combination of one or more control scenarios applicable thereto, an energy saving rate may be calculated based on the amount of used energy that is calculated, and thus, the energy saving rate (or the amount of consumption power) and a combination of one or more control scenarios corresponding thereto may be calculated.

The storage unit 130 may store a relationship between the calculated energy saving rate of the modeled facility or equipment and the calculated combination of the one or more control scenarios.

Since an energy saving rate of facilities or equipment that operate according to first and second control scenarios can not be calculated by simply summating an energy saving rate of facilities or equipment that operate according to the first control scenario and an energy saving rate of facilities or equipment that operate according to the second control scenario, an energy saving rate of facilities or equipment may be calculated based on the amount of energy used by a modeled facility or equipment, but the scope of the present disclosure is not limited thereto. In other exemplary embodiments, a relationship between an energy saving rate of facilities or equipment and a combination of one or more control scenarios may be calculated by other methods.

In an exemplary embodiment, by using the energy saving rate calculation module 124, the control unit 120 may determine a combination of one or more control scenarios according to an energy saving rate and may control facilities or equipment according to the determined combination of the one or more control scenarios.

Therefore, based on a predetermined energy saving rate or an energy saving rate input from a user, the control unit 120 (or controller) may supply the user with a combination of one or more control scenarios corresponding to the energy saving rate by using a relationship between an energy saving rate (or the amount of consumption power) of facilities or equipment and a combination of one or more control scenarios calculated by the energy saving rate calculation module 124, and may also control driving of a corresponding facility or equipment according to the determined combination of the one or more control scenarios.

Therefore, according to an exemplary embodiment, a user may set a control scenario that is a control command for facilities or equipment to be controlled. However, although another user does not have sufficient knowledge of facilities or equipment or does not have knowledge of a control scenario, the other user may simply set only an energy saving rate, thereby controlling the facilities or the equipment according to a combination of one or more control scenarios based on the energy saving rate.

The central control apparatus 100 according to an exemplary embodiment, as illustrated in FIG. 2, may further include the storage unit 130 (or storage device).

The storage unit 130 may store a relationship between an energy saving rate (or the amount of consumption power) of facilities or equipment and a combination of one or more control scenarios.

The storage unit 130 may store a program for processing and control by the control unit 120 and may perform a function of temporarily storing pieces of input/output data (e.g. data collected by the data collection module 121, information about facilities, information about a control scenario, a relationship between an energy saving rate of facilities or equipment and a combination of one or more control scenarios, various user inputs, and/or the like).

The storage unit 130 may include at least one type storage medium of a flash memory type, a hard disk type, a solid state disk (or a solid state drive, SSD), a multimedia card micro type, a card type memory (for example, a micro-secure digital (SD) memory, an extreme digital (XD) memory, or the like), random access memory (RAM), static random access memory (SRAM), read-only memory (ROM), electrically erasable and programmable read-only memory (EEPROM), programmable read-only memory (PROM), a magnetic memory, a magnetic disk, and an optical disk.

The central control apparatus 100 may operate a web storage, which performs a storing function of the storage unit 30, on the Internet.

As illustrated in FIG. 2, the central control apparatus 100 according to an exemplary embodiment may further include the display unit 140 (or display device).

The display unit 140 may be a display apparatus that is wire or wirelessly connected to the central control apparatus 100, and the display unit 140 may display information obtained through processing by the central control apparatus 100. For example, the display unit 140 may display a user interface or a graphic user interface associated with a function provided by the central control apparatus 100.

Therefore, the display unit 140 may display the amount of used energy and/or an energy saving rate of facilities or equipment, calculated by the control unit 120, on a screen in various forms such as a text, a graph, etc.

The control unit 120 may match a graphic object of facilities or equipment with a position, corresponding to a position at which the facilities or the equipment are disposed, in various drawings and may display a result of the matching on a screen of the display unit 140.

Therefore, a user may select the graphic object displayed on the screen of the display unit 140, and thus, the control unit 120 may display state information or a control command list of facilities or equipment, corresponding to the selected graphic object, on the screen of the display unit 140.

The display unit 140 may include at least one of a liquid crystal display (LCD), a thin film transistor-liquid crystal display, an organic light-emitting diode (OLED) display, a flexible display, and a three-dimensional (3D) display. The central control apparatus 100 may include two or more display units 1210 depending on an implementation type thereof. For example, an external display apparatus and an internal display apparatus (not shown) may all be included in the central control apparatus 100.

When the display unit 140 and a sensor (hereinafter referred to as a touch sensor) sensing a touch motion form (hereinafter referred to as a touch screen) a layer structure, the display unit 140 may be used as an input device in addition to an output device. The touch sensor may have, for example, a type such as a touch film, a touch sheet, a touch pad, and/or the like.

According to an exemplary embodiment, as illustrated in FIG. 2, the central control apparatus 100 may further include the communication unit 150.

The communication unit 150 (or communication device) may transmit or receive a direct control command, a control program, an execution result of the control program, and/or the like to or from the facilities 300 and 300' or the equipment 400 and 400', or may transmit or receive a direct control command, a control program, an execution result of the control program, and/or the like to or from the facility control apparatus 200.

The communication unit 150 may receive, from the facility control apparatus 200, a control result of facilities controlled by the facility control apparatus 200 and information about a control processing operation performed by the facility control apparatus 200.

The communication unit 150 may receive various pieces of information (e.g. state information) about facilities from a plurality of control points.

Therefore, the facility control apparatus 200 may control facilities or equipment that are a plurality of control targets.

The communication unit 150 may communicate with the meteorological administration server 30 and may receive, from the meteorological administration server 30, environment data that includes various pieces of weather information such as a temperature and humidity. The communication unit 150 may receive current real-time environment data and/or prediction environment data corresponding to an arbitrary future time.

The real-time environment data and/or the prediction environment data may be data of an area including the control target region.

The communication unit 150 may transfer, to the control unit 130, various pieces of information, received from the meteorological administration server 30. The control unit 130 may calculate an external load and an internal load of a control target region, based on the real-time environment data and/or the prediction environment data and may simulate the amount of consumption power of a modeled facility by using the calculated external load and internal load.

The central control apparatus 100 may be connected to an external terminal 500 through the communication unit 150. A user of the central control apparatus 100 may perform a function (e.g. a function of managing or controlling facilities) performed by the central control apparatus 100 by using the external terminal 500. The external terminal 500 may be one of various types of terminals including a mobile terminal.

The communication unit 150 may be implemented as one module, for communicating with the meteorological administration server 30, the facility control apparatus 200, and the external terminal 500. In other exemplary embodiments, the communication unit 150 may be implemented as a module that is distinguished for each of a plurality of targets.

The communication unit 150 may perform wired/wireless data communication with the external terminal 500. The communication unit 150 may include an electronic component for one or more of Bluetooth™, Zigbee, ultra-wide band (UWB), wired/wireless USB, near field communication (NFC), wired/wireless LAN, a mobile communication network, etc.

As described above, the central control apparatus 100 may include the input unit 110, and the input unit 110 may receive a user input that sets an energy saving rate, from a user.

FIGS. 7A to 7D are exemplary diagrams of a screen output by a central control apparatus according to an exemplary embodiment. Other embodiments and configurations may also be provided.

Figure 7A:
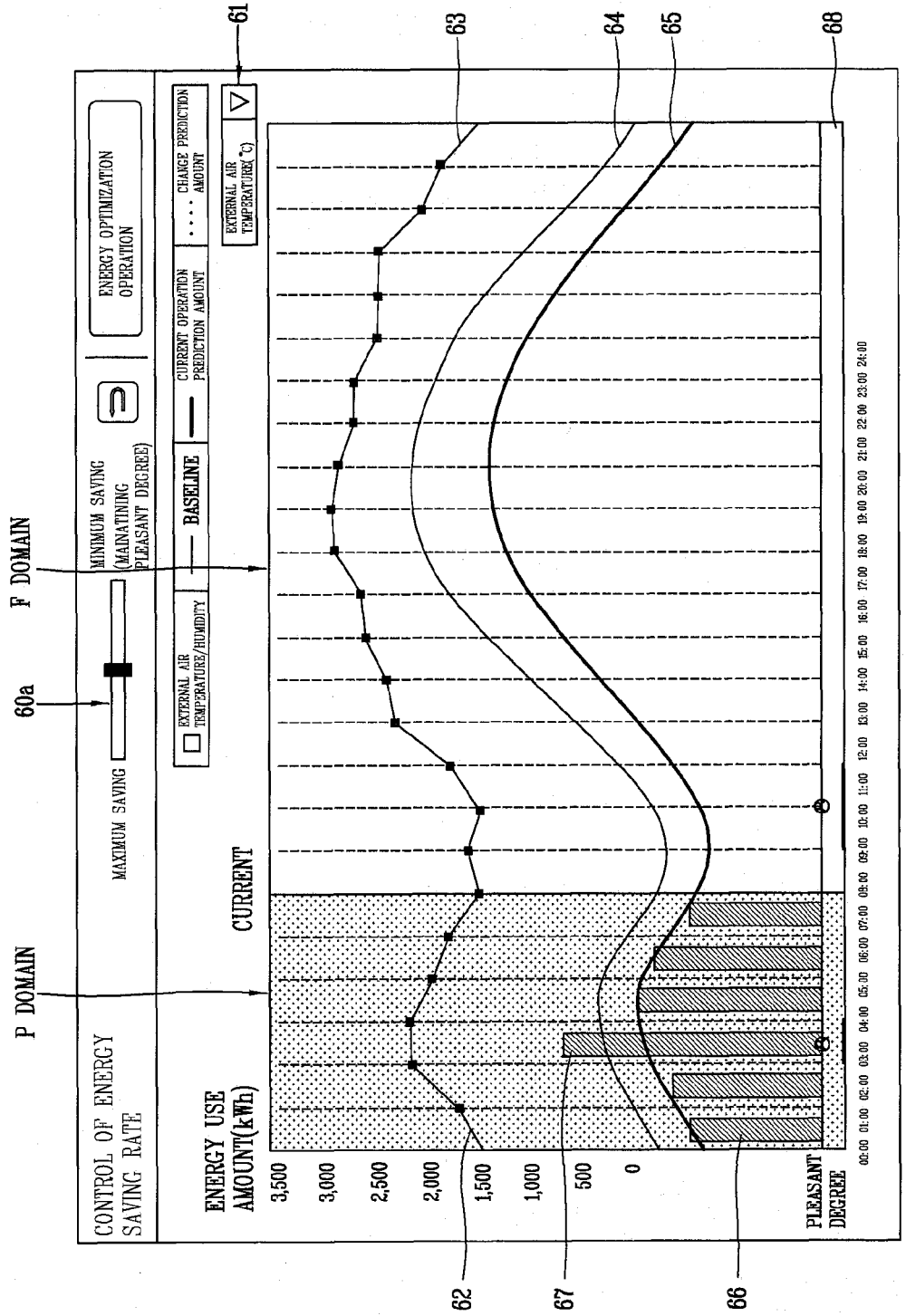

As illustrated in FIG. 7A, the central control apparatus 100 may display, on a screen of the display unit 140, a scroll bar 60a for receiving a setting input for an energy saving rate.

A user may set an energy saving rate by moving the scroll bar 60a displayed on the screen, and the control unit 120 (in more detail, a control scenario determination module 125) may determine a combination of one or more control scenarios, based on the energy saving rate set by moving the scroll bar 60a.

A range of the energy saving rate, which is received from the user through the scroll bar 60a, may be 0% to 100%. However, in other exemplary embodiments, the range of the energy saving rate may be a predetermined range of an energy saving rate.

The predetermined range of the energy saving rate may be a range of a pleasant degree. That is, in a facility or equipment that performs an air conditioning operation on a control target region, when the user controls an energy saving rate of the facility or the equipment, the energy saving rate set by the scroll bar 60a may be limited not to deviate from a predetermined range of a pleasant degree for the control target region.

Therefore, when a user that does not have sufficient knowledge of facilities or equipment or does not have knowledge of a control scenario sets an energy saving rate, a range of the energy saving rate may be limited so that a person in a control target region does not feel displeasure.

However, when a predetermined range of an energy saving rate is a range of a pleasant degree, the predetermined range of the energy saving rate may be changed with the season, with time, according to an external air temperature or an internal air temperature, according to an external load or an internal load, and/or the like.

According to another exemplary embodiment, as illustrated in FIG. 7B, the central control apparatus 100 may display, on a screen of the display unit 140, an input window 60b for receiving a setting input for an energy saving rate.

The input window 60b may be configured to directly receive a number from a user, or may be configured in order for numbers included in the input window 60b to increase or decrease at predetermined intervals according to an input that selects at least one (for example, a ▲/▼ button) of buttons arranged on one side of the input window 60b.

According to the above-described exemplary embodiment, the control unit 120 may display a time-based energy use rate as a graph 65 on a screen by using a simulation result of consumption power of a modeled facility that operates according to a combination of one or more control scenarios determined based on an input energy increase/decrease rate.

According to another exemplary embodiment for receiving a setting input for an energy saving rate, as illustrating in FIGS. 7A and 7B, the setting input for the energy saving rate may be received based on a user input that upward and downward moves a time-based energy use rate graph referred to by reference numeral 65.

That is, when the user moves the graph 65 in an up and down direction through a drag and drop, a certain range of the energy saving rate may be set according to a position of the moved graph 65.

The display unit 140 may display, as a time-based graph 63, at least one of pieces of prediction environment data (e.g. an external air temperature or humidity, an internal air temperature or humidity, and/or the like) that are received from the meteorological administration server 30 through a baseline 64 and the communication unit 150.

As described above, the baseline 64 may be a graph that shows, with respect to a time, the amount of energy used by facilities or equipment that do not perform an energy saving control operation. For example, when the facilities or the equipment are facilities or equipment that perform an air conditioning operation on a control target region, the baseline 64 may be a graph that shows, with respect to a time, the amount of energy used by facilities or equipment for which driving is controlled according to a setting temperature set by a user input.

The display unit 140 may display, on a screen, at least one of pieces of prediction environment data (e.g. an external air temperature or humidity, an internal air temperature or humidity, and/or the like) of a control target region. The central control apparatus 100 may receive a selection input that selects at least one of pieces of prediction environment data that are to be displayed on a screen in a form such as a combo box, a list box, an edit box, and/or the like, and the display unit 140 may display a graph that shows prediction environment data selected according to a user input.

As a detailed example, when a selection input for selecting an external air temperature is received through a combo box 61 from a user, the display unit 140 may display an external air temperature, which is measured for a certain time and is received from the meteorological administration server 30, in the form of a graph 63 on a screen.

As described above, the control unit 120 may calculate a pleasant degree with time by using prediction environment data that is received from the meteorological administration server 30 through the communication unit 150, based on a certain reference such as PMV, PPD, and/or the like, and may display the calculated pleasant degree as a graphic object on a screen of the display unit 140, based on a certain range of a pleasant degree.

As a detailed example, when PPD is lower than 10%, the display unit 140 may display a graphic object, which expresses a smiling face, in a corresponding time domain, and when PPD is equal to or higher than 10% and is lower than 25%, the display unit 140 may display a graphic object, which expresses an impassive face, in the corresponding time domain. When PPD is equal to or higher than 25%, the display unit 140 may display a graphic object, which expresses a frown face, in the corresponding time domain. As illustrated in FIGS. 7A and 7B, by displaying a graphic object expressing a frown face at 02:00 to 03:00 and 07:00 to 09:00, a user may immediately recognize that a pleasant degree of a control target region is evaluated as being slightly unpleasant at a corresponding time.

The control unit 120 may determine a combination of one or more control scenarios, based on an energy saving rate input through the input unit 110 and may directly control facilities or equipment directly or through the facility control apparatus 200 according to the determined combination of the one or more control scenarios.

The display unit 140 may display an energy optimization application button (a button illustrated at a right upper end of FIGS. 7A and 7B) on a screen. When the energy optimization application button is selected through the input unit 110, the control unit 120 may output, in the form of a graph, the amount of consumption power of a modeled facility or equipment that operates according to a combination of one or more control scenarios determined based on an energy saving rate input from a user, or may allow an actual facility or equipment, which is to be modeled by the combination of the one or more control scenarios determined based on the energy saving rate, to be controlled.

The display unit 140 may display, on a screen, the combination of one or more control scenarios determined based on the energy saving rate input from the user.

FIG. 7C is an exemplary diagram of a screen displaying a combination of one or more control scenarios determined based on an energy saving rate.

As illustrated in FIG. 7C, the display unit 140 may display a notification window 69a outputting a combination of one or more control scenarios, which is determined by the control unit 120 (in more detail, the control scenario determination module 125), based on an energy saving rate input from a user.

As described above, when facilities or equipment that are controlled according to a combination of one or more scenarios determined by the control unit 120 are facilities or equipment that perform an air conditioning operation, the control unit 120 may display, as a graph, at least one of a baseline, a prediction use amount representing a simulation result of consumption power of a modeled facility that operates according to the combination of the one or more scenarios, and prediction environment data of a control target region, on a screen of the display unit 140.

For example, as illustrated in FIGS. 7A and 7B, the display unit 140 may display, on a screen, an external air temperature of a control target region, a baseline, and a prediction use amount representing a simulation result of consumption power of a modeled facility that operates according to a combination of one or more scenarios.

As illustrated in FIGS. 7A and 7B, the display unit 140 may display, on a screen, a graph including two regions (a P domain and an F domain) that are divided with respect to a current time.

That is, according to an exemplary embodiment, the display unit 140 may display, as a graph on a screen, at least one of a baseline, a prediction use amount representing a simulation result of consumption power of a modeled facility that operates according to a combination of one or more scenarios, and prediction environment data of the control target region, in a time domain (the F domain) subsequent to the current time. The control unit 120 may update and output the baseline, the prediction use amount, and state information in a time domain (the P domain) previous to the current timing as the current time elapses.

The prediction environment data, which is output in the time domain (the P domain) previous to the current time, may be displayed in the form of a graph obtained through update performed based on state information of facilities or equipment that is collected through a control point by the data collection module 121.

The control unit 120 (in more detail, the energy use amount simulation module 123) may simulate consumption power of a modeled facility by using environment data that is newly collected by the data collection module 121 at an arbitrary time or at every arbitrary period, and may update a graph showing an previously output prediction use amount in the time domain (the P domain) previous to the current time, thereby displaying the prediction use amount.

The control unit 120 may update and output a graph showing prediction environment data, which is previously output in the time domain (the F domain) subsequent to the current time, based on prediction environment data (e.g. an external air temperature or humidity, an internal air temperature or humidity, and/or the like) of a control target region that is newly received from the meteorological administration server 30 through the communication unit 150 in real time or at predetermined time intervals.

In a target facility of which the prediction use amount is simulated, the control unit 120 may receive an actually measured amount of power consumed by the facility through the data collection module 121 and a control point, and may display actual measurement consumption power amounts 66 and 67 as various forms of graphs on a screen.

For example, as illustrated in FIGS. 7A and 7B, the actual measurement consumption power amounts 66 and 67 of a target facility of which a prediction use amount is simulated at certain time intervals (e.g. at every one hour) may be displayed in the form of a rod graph on a screen.

In this example, it can be seen that the actual measurement consumption power amounts 66 and 67 are similar to an energy use amount value of a graph 65 showing a simulation result of consumption power of a modeled facility that operates according to a combination of one or more scenarios determined based on an energy increase/decrease rate input from a user, and thus it can be seen that an accuracy of the prediction use amount is relatively high.

However, for example, when the user arbitrarily and forcibly drives facilities or equipment or at least one of the facilities, the equipment, the facility control apparatus, and the central control apparatus is broken down, the actual measurement consumption power amount 67 may exceed a prediction use amount representing showing a simulation result of consumption power of a modeled facility that operates according to a combination of one or more scenarios.

Therefore, when a difference between the actual measurement consumption power amount and the prediction use amount is out of a predetermined range, an alarm may be displayed on a screen.

Figure 7D:
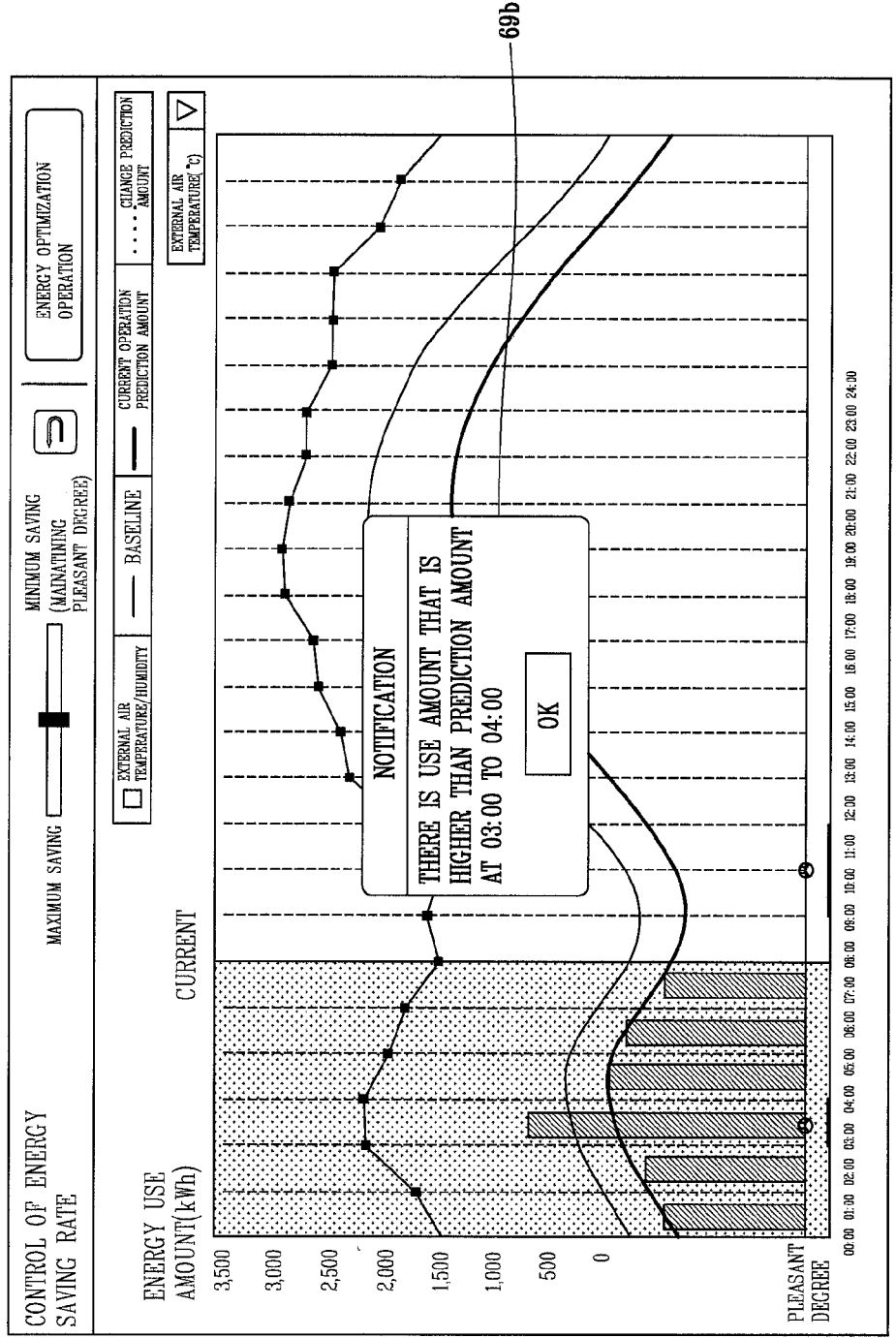

FIG. 7D is an exemplary diagram of a screen displayed when an energy use amount higher than a prediction use amount representing a consumption power simulation result of a modeled facility is measured.

That is, as illustrated in FIG. 7D, when the difference between the actual measurement consumption power amount and the prediction use amount is out of the predetermined range, the control unit 120 may display the notification window 69b on a screen to issue a warning to a user.

In this example, the predetermined range may be arbitrarily set by the user, and may be equal to or broader than an error range between the actual measurement consumption power amount and the prediction use amount.

The error range may be set by a user input. However, in other exemplary embodiments, the control unit 120 may set the error range, based on a difference between a previously measured actual measurement consumption power amount and the prediction use amount. That is, the control unit 120 may collect data of the previously measured actual measurement consumption power amount and the prediction use amount during a certain duration and may set, as the error range, an average of differences between the actual measurement consumption power amounts and the prediction use amounts that are collected during the certain duration.

For example, as illustrated in FIG. 7D, in a case where the actual measurement consumption power amount is higher than the prediction use amount at 03:00 to 04:00, the control unit 120 may display, on a screen, a window that informs the case and may visually and acoustically output the warning to the outside by using various notification means.

According to an exemplary embodiment, at least one control target region may be selected from among a plurality of control target regions through the input unit 110, and the display unit 140 may display, on a screen, a prediction use amount or an energy saving rate of facilities included in the selected at least one control target region.

The input unit 110 may receive an input that selects at least one facility or equipment to be controlled from among a plurality of facilities or equipment, and the display unit 140 may display, on a screen, a prediction use amount or an energy saving rate of the selected at least one facility or equipment.

That is, the user may select facilities or equipment included in each of a plurality of groups, which each include a plurality of facilities or equipment for each of a plurality of control target regions or according to an arbitrary reference, and the display unit 140 may display, on a screen, a prediction use amount or an energy saving rate of facilities or equipment included in a selected control target region or a selected group.

Therefore, the control unit 120 may determine a combination of one or more scenarios for at least one facility or equipment included in a control target region or a group which is selected based on an energy saving rate input by the user, and may control the at least one facility or equipment according to the determined combination of the one or more scenarios.

Therefore, the user conveniently allows an energy saving operation to be performed for each control target region or each group.

Figure 9A:
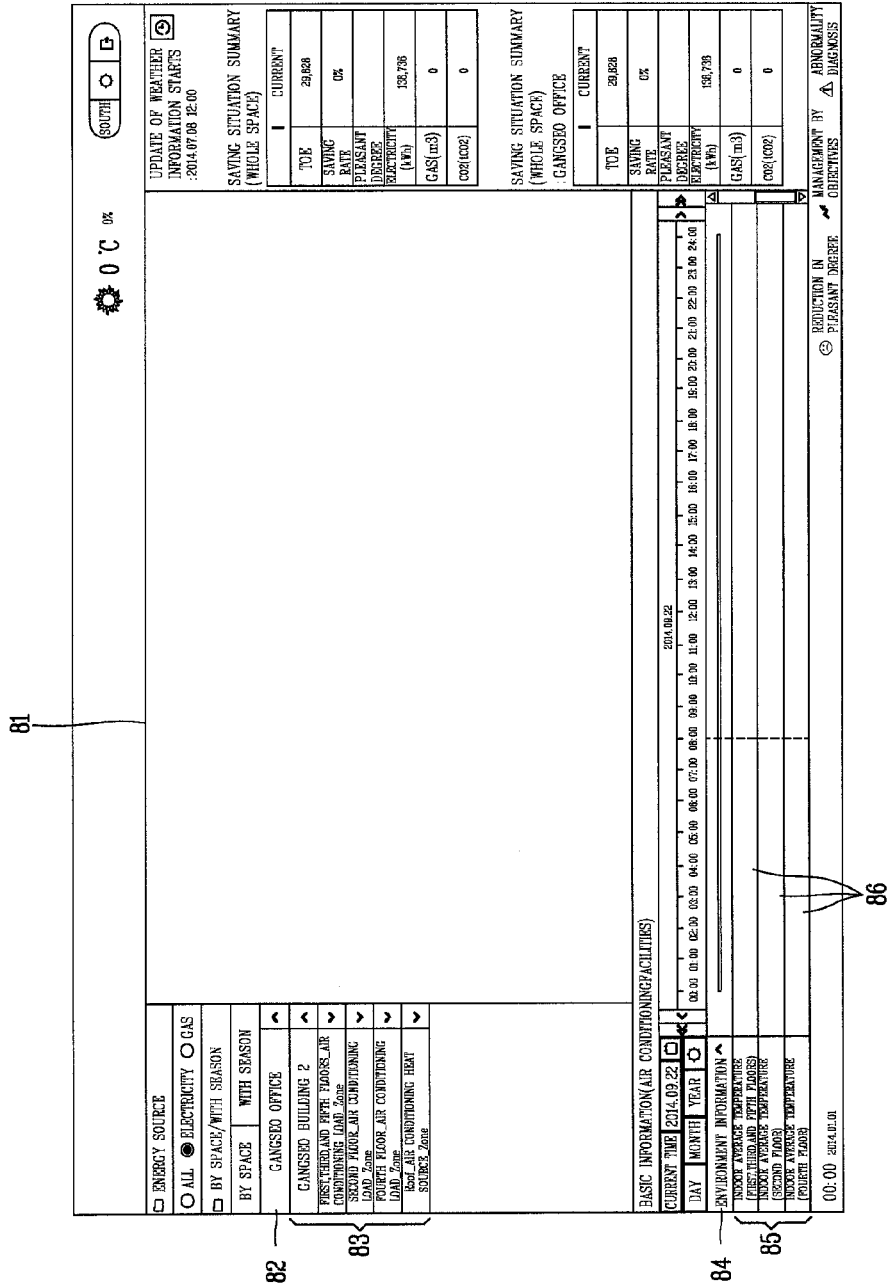
FIG. 9A is an exemplary diagram of a screen, which is provided for selecting a control target to which a combination of one or more control scenarios is applied, according to an exemplary embodiment.

FIG. 9A is an exemplary diagram of a screen that is provided for selecting a control target to which a combination of one or more control scenarios is applied, according to an exemplary embodiment.

A user may select a control target region by using at least one input button displayed on a screen, select one building from among a plurality of buildings, and select an arbitrary space or floor of the selected building.

For example, one or more buttons (e.g. combo boxes 82 and 83) for selecting a control target region may be arranged in one region of a screen illustrated in FIG. 9A.

The user may select a first button 82 to select a building "gangseo building 2", and may select one button from among a plurality of second buttons 83 displayed based on the selected building to select a control target region.

In this example, as described above, at least one facility or equipment may be selected with a control target region as one unit, or one facility or equipment may be selected from among a plurality of facilities or equipment located in a selected space or on a selected floor. That is, the user may select a second-floor air conditioning load zone to select one facility from among a plurality of facilities located therein.

Figure 9B:
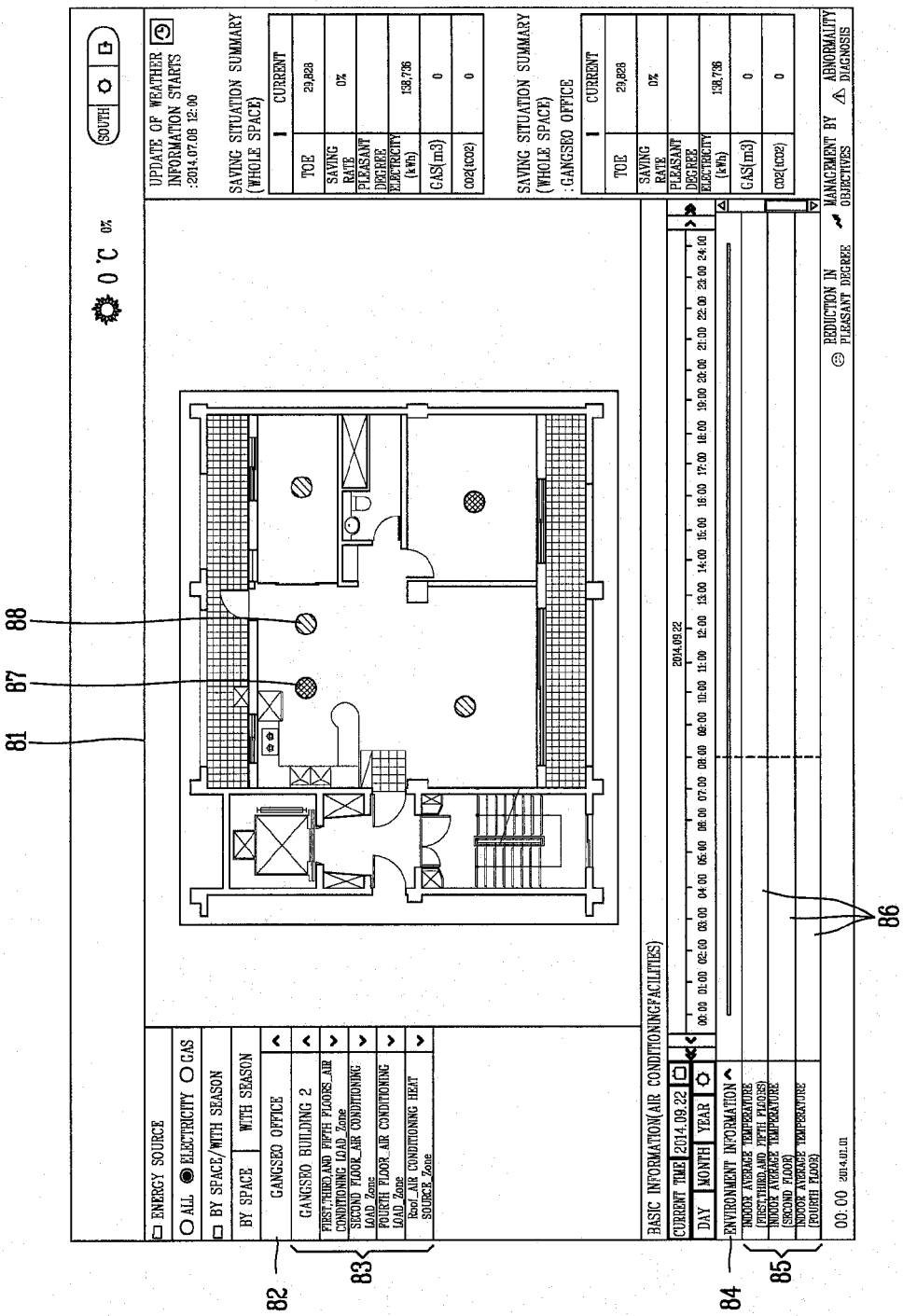
FIG. 9B is an exemplary diagram of a screen on which a control target region selected by a user and facilities installed in the control target region are displayed as graphic objects.

FIG. 9B is an exemplary diagram of a screen on which a control target region selected by a user and facilities installed in the control target region are displayed as graphic objects.

As illustrated in FIG. 9B, the display unit 140 may display a graphic object, representing facilities such as illumination, an indoor unit, and/or the like on a drawing that shows an arbitrary space or floor selected by a user, on a partial region of a screen in the form of a popup window.

Therefore, the user may select at least one graphic object representing facilities or equipment, and the control unit 120 may determine a combination of one or more control scenarios for at least one facility or equipment selected by the user according to a predetermined energy saving rate and may control the selected facility or equipment according to the determined combination of the one or more control scenarios.

As described above, the display unit 140 may display a graphic object, representing facilities or equipment, on a drawing that represents a control target region, and thus the user easily identifies which position facilities or equipment to be controlled are located. A problem may be solved where facilities or equipment undesired by the user are controlled.

Furthermore, the display unit 140 may provide a drawing of a building in order for the user to select an arbitrary space or floor or may provide a map, on which positions of buildings are marked, in order for the user to select a specific building.

Therefore, according to an exemplary embodiment, FIGS. 7A and 7B, which are exemplary diagrams of a screen displayed in order for the control unit 120 to receive an energy saving rate of a control target selected through the input unit 110, may be displayed on one region of a screen referred to by reference numeral 81 of FIGS. 9A and 9B.

As illustrated in FIGS. 9A and 9B, the display unit 140 may display, on one region 86 of a screen, graphs showing one or more of a baseline, a prediction use amount, and prediction environment data of a control target region for each of a plurality of control target regions or each of a plurality of groups which each include a plurality of facilities or equipment for each control target region or according to the arbitrary reference. The displayed graphs may be located at adjacent positions, and thus a user can immediately recognize a state of each control target region or a state of each group desired by the user.

As a detailed example, as illustrated in FIGS. 9A and 9B, when the input unit 110 receives, from the user, an input that selects "environment information", the control unit 120 may provide, through a screen, the user with various pieces of information (e.g. an external air temperature or humidity, an internal air temperature or humidity, and/or the like) included in environment information, and then when an input that selects environment information (e.g. indoor average temperature (first, third, and fifth floors), indoor average temperature (second floor), and indoor average temperature (fourth floor) of each control target region is received from the user, the control unit 120 may output state information (e.g. an internal air temperature) of each of selected control target regions.

As described above, the display unit 140 may display a combination of one or more scenarios, which is determined by the control unit 120 (in more detail, the control scenario determination module 125), based on an energy saving rate, which is input from the user, and the input unit 110 may receive a user input that corrects the determined combination of one or more scenarios.

Figure 8A:
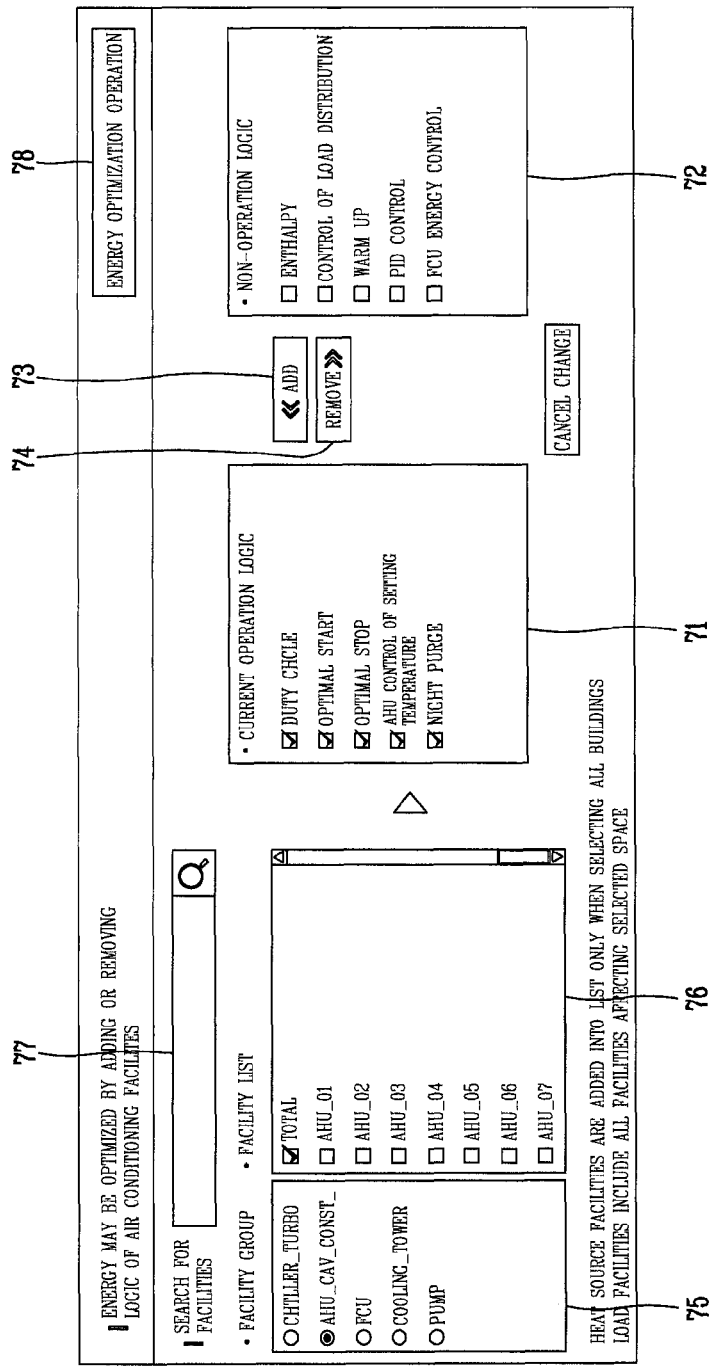
FIGS. 8A and 8B are exemplary diagrams of a screen output by a central control apparatus according to an exemplary embodiment.
Figure 8B:
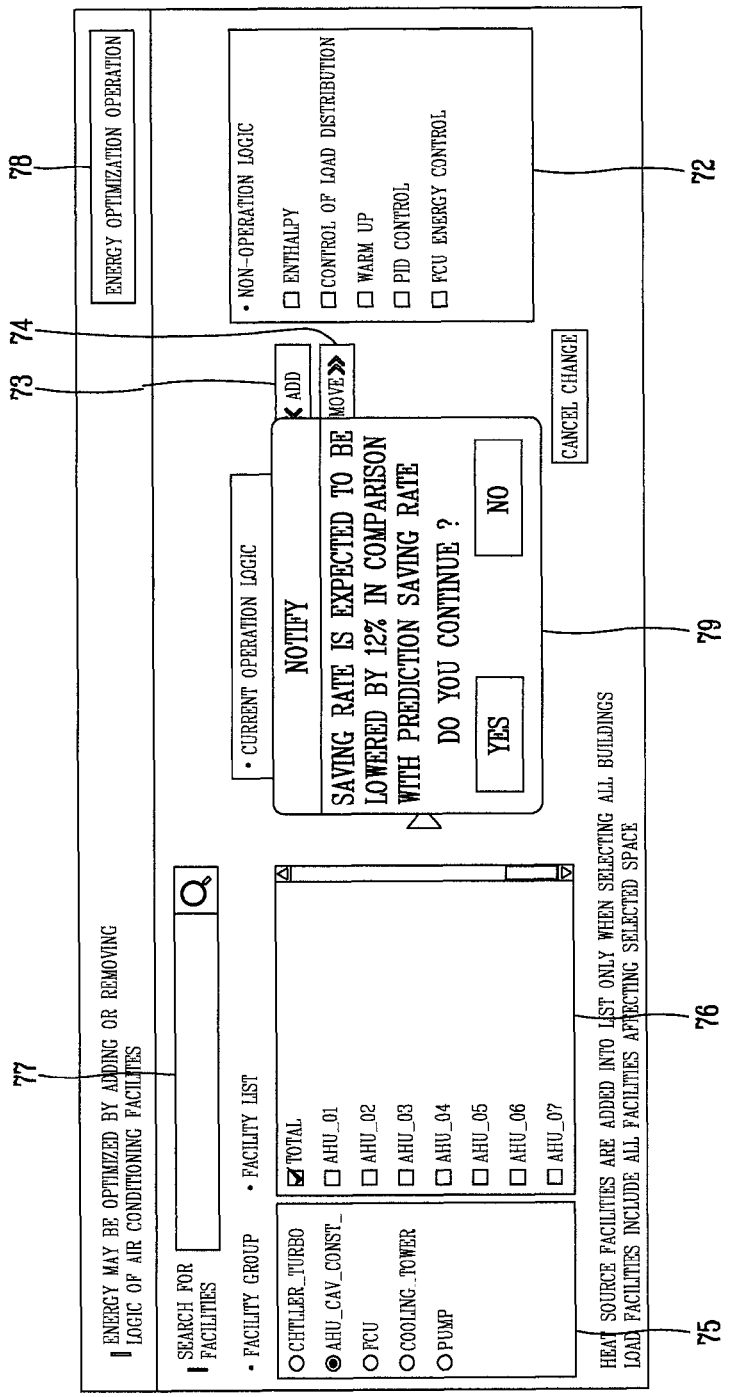

FIGS. 8A and 8B are other exemplary diagrams of a screen output by a central control apparatus according to an exemplary embodiment. Other embodiments and configurations may also be provided.

That is, as illustrated in FIG. 8A, the display unit 140 may display a combination of control scenarios, determined by the control scenario determination module 125, on one region 71 of a displayed screen in a list form.

For example, when the input unit 110 receives, from a user, an input that sets an energy saving rate, the control scenario determination module 125 may determine a combination of one or more control scenarios by using the input energy saving rate, and the display unit 140 may display, on a region 71, control scenarios "Duty Cycle", "Optimal Start", "Optimal Stop", "AHU Setting Temperature Control", and "Night Purge" determined by the control scenario determination module 125.

The display unit 140 may display, on the other one region 72 of the displayed screen, at least one control scenario applicable to facilities or equipment that perform an energy saving control operation.

That is, the control unit 120 (in more detail, the facility control logic module 1232) may select at least one applicable control scenario depending on kinds of facilities or equipment that perform the energy saving control operation, and may display the selected at least one control scenario on a screen of the display unit 140.

A control scenario incapable of being applied to the facilities or the equipment is not displayed on a screen, thereby preventing the facilities or the equipment from being wrongly controlled by a user that does not have sufficient knowledge of the facilities or the equipment or does not have knowledge of a control scenario.

Therefore, the input unit 110 may receive a user input for correcting a combination of one or more control scenarios (hereinafter referred to as a first control scenario list) that is currently determined by the control scenario determination module 125. That is, one of one or more control scenarios (hereinafter referred to as a second control scenario list) applicable to facilities or equipment for performing the energy saving control operation may be added to the first control scenario list, or at least one control list may be removed from the first control scenario list.

As illustrated in FIG. 8A, when the input unit 110 receives an input that selects "PID Control" displayed on the region 72 and receives an input that selects an addition button 73, the control unit 120 may add "PID Control" to the first control scenario list.

Subsequently, when the input unit 110 receives an input that selects an energy optimization application button 78, the control unit 120 may newly calculate an energy saving rate according to a control scenario where "PID Control" is added to the first control scenario list, or may perform the energy saving control operation on corresponding facilities or equipment according to the newly calculated energy saving rate.

For example, the control unit 120 may simulate consumption power of a modeled facility that operates according to the control scenario where "PID Control" is added to the first control scenario list, and as illustrated in FIGS. 7A to 7D, the control unit 120 may display, as a graph on a screen, an energy saving rate or a prediction use amount based on time.

As another example, the control unit 120 may control an actual target facility that has been simulated according to the control scenario where "PID Control" is added to the first control scenario list.

In this example, the energy saving rate calculation module 124 may calculate a first energy saving rate according to a combination of control scenarios that have been corrected according to a user input, and the control unit 120 may compare the first energy saving rate with a second energy saving rate calculated based on a combination of one or more control scenarios which is determined by the control scenario determination module 125 before the first energy saving rate is corrected. When the first energy saving rate is higher than the second energy saving rate, the control unit 120 may display an alarm on a screen.

FIG. 8B is an exemplary diagram of a screen that is displayed when a first energy saving rate is higher than a second energy saving rate.

As illustrated in FIG. 8B, when the first energy saving rate is higher than the second energy saving rate, the control unit 120 may display a notification window 79 on the screen to issue a warning to a user.

For example, when a combination of control scenarios corrected by the user is lower in energy saving rate than a combination of one or more control scenarios determined by the control scenario determination module 125, the control unit 120 may again check whether the user has an intention of correcting a combination of control scenarios, thereby preventing facilities or equipment from being wrongly controlled by a user that does not have sufficient knowledge of the facilities or the equipment or does not have knowledge of a control scenario.

The control unit 120 may set a certain range, and only when a difference between the first energy saving rate and the second energy saving rate is out of the set range, the control unit 120 may display the notification window 79 on the screen.

This may be for allowing control suitable for the user's intention to be performed by preferentially taking into account the user's intention even when an energy saving rate is slightly lowered according to the corrected combination of the control scenarios.

For example, as illustrated in FIG. 8B, the control unit 120 may display, on the screen, a window notifying that the first energy saving rate based on the corrected combination of the control scenarios is expected to be lowered by 12% in comparison with the second energy saving rate based on a predetermine combination of control scenarios. The control unit 120 may visually and acoustically output the warning to the outside by using various notification means.

According to an exemplary embodiment, at least one control target region may be selected from among a plurality of control target regions through the input unit 110, and the display unit 140 may display, on the screen, a facility group or a facility list included in the selected at least one control target region.

The display unit 140 may display the facility group, included in the selected at least one control target region, on one region 75 of the screen, and when the input unit 110 receives, from the user, an input that selects one facility group from among a plurality of facility groups displayed on the screen, the display unit 140 may display, on one region 76 of the screen, a facility or equipment list corresponding to the selected facility group.

For example, as illustrated in FIG. 8A, a plurality of facility groups "CHILLER TURBO", "AHU CAV CONST", "FCU", "COOLING TOWER", and "PUMP" included in the input control target region may be displayed on the one region 75 of the screen displayed by the display unit 140. When an input that selects "AHU CAV CONST" from among a plurality of facility groups displayed on the region 75 is received from the user, a plurality of facility or equipment lists "AHU_01", "AHU_02", "AHU_03", "AHU_04", "AHU_05", "AHU_06", and "AHU_07" corresponding to the input may be displayed on the one region 76 of the screen.

At least one control target facility or equipment may be selected from among a plurality of facilities (or equipment) through the input unit 110, and the display unit 140 may display, on the screen, at least one control scenario which is determined for the selected at least one facility or equipment.

For example, as illustrated in FIG. 8A, at least one control scenario, which is determined by the control scenario determination module 125 based on a set energy saving rate for the selected at least one facility or equipment, may be displayed on the one region 71 of the screen displayed by the display unit 140.

As described above, at least one control scenario list applicable to the selected at least one facility or equipment may be displayed on the screen.

For example, as illustrated in FIG. 8A, at least one control scenario list "Enthalpy", "Load Dispersion Control", "Warm Up", "PID Control", and "FCU Energy Control" applicable to the selected at least one facility or equipment may be displayed on the screen.

According to another exemplary embodiment, at least one of a name, an identifier (ID), a kind, and an installation position that indicate facilities or equipment may be a factor, and the control unit 120 may display, on the screen, a list of facilities or equipment corresponding to the factor.

As illustrated in FIG. 8A, the input unit 110 may receive keywords from the user through a search window 77, and the control unit 120 may extract at least one factor from the received keywords. Therefore, the control unit 120 may display, on the screen, at least one facility or equipment list corresponding to the factor among a plurality of facility or equipment lists stored in the storage unit 130, based on the factor.

For example, when "AHU" is input through the search window 77 from the user, by using "AHU" as a factor, the control unit 120 may display, on the one region 76 of the screen, a plurality of facility or equipment lists "AHU_01", "AHU_02", "AHU_03", "AHU_04", "AHU_05", "AHU_06", and "AHU_07" corresponding to the factor.

As described above, FIG. 9A is an exemplary diagram of a screen that is provided for selecting a control target to which a combination of one or more control scenarios is applied, according to an exemplary embodiment of the present disclosure.

In order to select a control target region, a user may select one building from among a plurality of buildings and may select an arbitrary space or floor of the selected building by using at least one input button displayed on a screen.

For example, one or more buttons (e.g. the combo boxes 82 and 83) for selecting a control target region may be arranged in one region of a screen illustrated in FIG. 9A.

The user may select the first button 82 to select a building "gangseo building 2", and may select one button from among the plurality of second buttons 83 displayed based on the selected building to select a control target region.

In this example, as described above, at least one facility or equipment may be selected with a control target region as one unit, or one facility or equipment may be selected from among a plurality of facilities or equipment located in a selected space or on a selected floor. That is, the user may select a second-floor air conditioning load zone to select one facility from among a plurality of facilities located therein.

FIG. 9B is an exemplary diagram of a screen on which a control target region selected by a user and facilities installed in the control target region are displayed as graphic objects.

As illustrated in FIG. 9B, the display unit 140 may display a graphic object, representing facilities such as illumination 88, an indoor unit 87, and/or the like on a drawing that shows an arbitrary space or floor selected by a user, on a partial region of a screen in the form of a popup window.

Therefore, the user may select at least one graphic object representing facilities or equipment, the control unit 120 may determine a combination of one or more control scenarios for at least one facility or equipment selected by the user, and the display unit 120 may display, on a screen, the combination of the one or more control scenarios determined by the control unit 120.

For example, when an input that selects a graphic object representing the indoor unit 87 is received from the user, the display unit 140 may display, on a screen, the combination of the one or more control scenarios which is determined for the selected indoor unit 87 by the control unit 120.

As described above, the display unit 140 may display a graphic object, representing facilities or equipment, on a drawing which represents a control target region, and thus, the user easily identifies which position facilities or equipment to be controlled are located. A problem may be solved where facilities or equipment undesired by the user are controlled.

The display unit 140 may provide a drawing of a building in order for the user to select an arbitrary space or floor or may provide a map, on which positions of buildings are marked, in order for the user to select a specific building.

Therefore, FIGS. 8A and 8B, which are exemplary diagrams of a screen displayed for outputting and correcting a combination of one or more control scenarios which is determined for facilities or equipment by the control scenario determination module 125, may be displayed on one region of a screen referred to by reference numeral 81 of FIGS. 9A and 9B.

As illustrated in FIGS. 9A and 9B, the display unit 140 may display, on one region 86 of a screen, graphs showing one or more of a baseline, a prediction use amount, and prediction environment data of a control target region for each of a plurality of control target regions or each of a plurality of groups which each include a plurality of facilities or equipment for each control target region or according to the arbitrary reference. The displayed graphs may be located at adjacent positions, and thus, a user can immediately recognize a state of each control target region or a state of each group desired by the user.

As a detailed example, as illustrated in FIGS. 9A and 9B, when the input unit 110 receives, from the user, an input that selects "environment information", the control unit 120 may provide, through a screen, the user with various pieces of information (e.g. an external air temperature or humidity, an internal air temperature or humidity, and/or the like) included in environment information, and then when an input that selects environment information (e.g. indoor average temperature (first, third, and fifth floors), indoor average temperature (second floor), and indoor average temperature (fourth floor) of each control target region is received from the user, the control unit 120 may output state information (e.g. an internal air temperature) of each of selected control target regions.

As described above, the display unit 140 may display a combination of one or more scenarios which is determined by the control unit 120 (in more detail, the control scenario determination module 125), based on an energy saving rate which is input from the user, and the input unit 110 may receive a user input that corrects the determined combination of one or more scenarios.

Figure 10:
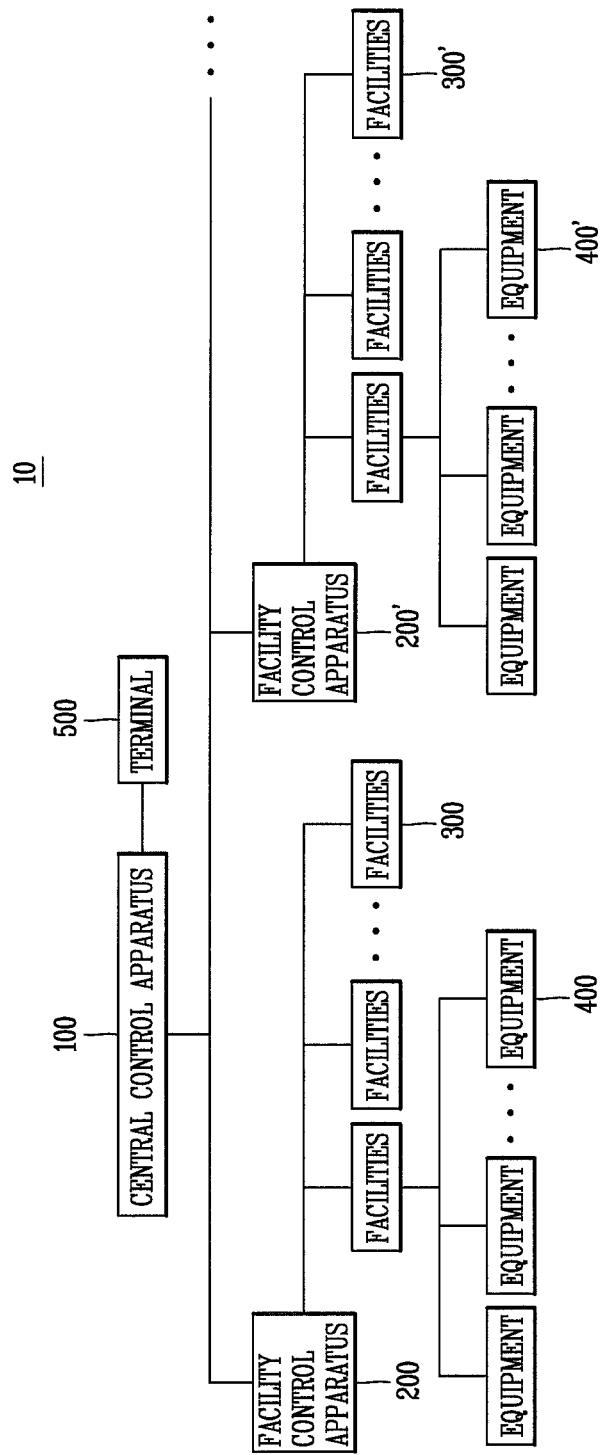
FIG. 10 is a block diagram of a facility control system including a central control apparatus according to an exemplary embodiment and a terminal which are connected to each other.

FIG. 10 is a block diagram of a facility control system including the central control apparatus 100 according to an exemplary embodiment and an external terminal 500 that are connected to each other. Other embodiments and configurations may also be provided.

As illustrated in FIG. 10, the central control apparatus 100 may be connected to the external terminal 500 by wire or wirelessly.

The external terminal 500 may display, on a screen of a display device, various pieces of information received from a central control apparatus 100, or may receive various inputs from a user through an input means.

Therefore, the central control apparatus 100 may be communication-connected to the external terminal 500 and may transmit certain information to the external terminal 500 to enable the external terminal 500 to display a screen displayed by the display unit 140 of the central control apparatus 100.

For example, a screen corresponding to the screen displayed by the display unit 140 illustrated in FIGS. 7A to 9B may be displayed by the display means of the external terminal 500.

The external terminal 500 may receive various inputs from the user through the input means and may transfer information, which is input from the user, to the central control apparatus 100.

Therefore, the control unit 120 (of the central control apparatus 100) may perform certain processing, based on the information received from the external terminal 500 and may externally display a result of the processing in the display unit 140 and/or a display device of the external terminal 500.

The external terminal 500 may generate a control command based on a user input and may transmit the generated control command to the central control apparatus 100 to control facilities or equipment through the central control apparatus 100.

The external terminal 500 may perform functions performed by the input unit 110 and display unit 140 of the central control apparatus 100, and thus, even when the user is located at a remote place, the user may input an energy saving rate for facilities or equipment, thereby performing an energy optimization control operation. The external terminal 500 may remotely perform the same function as a function, which is performed by the central control apparatus 100 according to an exemplary embodiment, such as a function of correcting a combination of control scenarios determined based on the energy saving rate. A function performed by the central control apparatus 100 is the same as the above-described details, and thus its detailed description may not be repeated.

Facility Control Method

Figure 11:
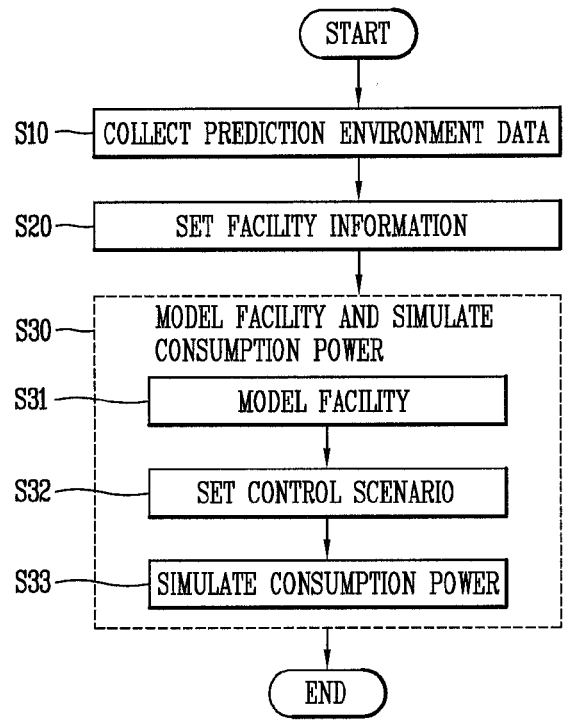
FIG. 11 is a flowchart illustrating a facility control method according to an exemplary embodiment

FIG. 11 is a flowchart illustrating a facility control method according to an exemplary embodiment. Other embodiments and configurations may also be provided.

As illustrated in FIG. 11, the facility control method may include: operation S10 of collecting prediction environment data of a control target region from the meteorological administration server 30; operation S20 of setting information of at least one facility in the control target region; and operation S30 of modeling the at least one facility, based on the information of the at least one facility and simulating consumption power of the modeled at least one facility that operates according to a control scenario.

The facility control method may be described in detail, but descriptions of the same elements as the above-described elements may not be repeated.

In operation S10 of collecting the prediction environment data, the control unit 120 (in more detail, the data collection module 121) may collect the prediction environment data including weather information of the control target region, or may collect state information of facilities or equipment through a control point.

In this example, the data collection module 121 may receive, from the meteorological administration server 30, environment data that includes various pieces of weather information such as a temperature and humidity, predict environment data including weather information by using various algorithms, or read environment data which is stored in the storage unit 130 and includes weather information, thereby collecting current real-time environment data and/or prediction environment data corresponding to an arbitrary future time.

Subsequently, in operation S20 of setting the information of the at least one facility, the system setting module 122 may set the information of the at least one facility in the control target region.

The system setting module 122 may supply information of facilities, which is input from a user or is read from various storage mediums, to the energy use amount simulation module 123.

The information of the facilities may be information necessary for modeling the facilities and may include specifications of the facilities such as configurations, capacities, kinds, and/or the like of the facilities. Various pieces of information about the facilities may further include relationship information of a connection with other facilities, such as the kind of a facility connected to another facility, the number of the facilities, a combination of the facilities, and/or the like.

Therefore, in operation S30 of modeling the at least one facility and simulating the consumption power of the modeled at least one facility, the energy use amount simulation module 123 may model the at least one facility, based on the information of the at least one facility and may simulate the consumption power of the modeled at least one facility that operates according to the control scenario.

Operation S30 of modeling the at least one facility and simulating the consumption power of the modeled at least one facility may include: operation S31 of modeling the at least one facility, based on the information of the at least one facility; operation S32 of setting at least one control scenario applicable to the at least one facility; and operation S33 of simulating the consumption power of the modeled at least one facility that operates according to the set at least one control scenario.

In operation S31 of modeling the at least one facility, the facility modeling module 1231 may model the at least one facility, based on the information of the at least one facility supplied from the system setting module 122.

The facility modeling module 1231 may model elements included in the facilities, based on the information of the facilities and may model the amount of heat (e.g. a temperature of fluid moving between the elements, a flow rate, and/or the like) that is input and/or output between the elements, thereby modeling the facilities.

In operation S32 of setting the at least one control scenario applicable to the at least one facility, the system setting module 123 may supply, to the energy use amount simulation module 123, a control scenario for the facilities 300 and 300' or the equipment 400 and 400' in addition to the information of the at least one facility.

The system setting module 122 may supply the control scenario, which is input from the user or is read from various storage mediums, to the energy use amount simulation module 123.

The control scenario may be a set of one or more control commands having an order. That is, the control scenario may be a set of control commands for controlling the facilities 300 and 300' or the equipment 400 and 400', and as a detailed example, may be an optimal turn-on/off control operation, a setting temperature control operation, a duty control operation, and/or the like.

Therefore, the facility control logic module 1232 may select at least one scenario from among the plurality of control scenarios supplied from the system setting module 122, based on a facility modeled by the facility modeling module 1231 or may select at least one scenario from among the plurality of control scenarios, based on the specification and/or the like of facilities supplied by the system setting module 122.

The facility control logic module 1232 may select a control scenario, which is applicable to a facility of which consumption power is to be simulated, from among a plurality of control scenarios supplied from the system setting module 122.

The facility control logic module 1232 may set at least one control scenario applicable to facilities and may supply the at least one control scenario to the energy use amount prediction module 1233, and thus the energy use amount prediction module 1233 may calculate the amount of power consumed by a modeled facility that operates according to a predetermined control scenario.

In operation S33 of simulating the consumption power of the modeled at least one facility that operates according to the set at least one control scenario, a facility modeled by the facility modeling module 1231 may be supplied to the energy use amount prediction module 1233, and the energy use amount prediction module 1233 may simulate the amount of used energy by using the modeled facility.

That is, the energy use amount prediction module 1233 may determine an input variable as one of the kinds of facilities, capacities of the facilities, a connection relationship with other facilities, and driving conditions of the facilities by using the modeled facility, and thus, an output variable of the modeled facility may be consumption power of the modeled facility.

A time, for which the energy use amount prediction module 1233 simulates consumption power of a modeled facility, may be a predetermined arbitrary time or a predetermined arbitrary period. However, in other exemplary embodiments, the energy use amount prediction module 1233 may receive prediction environment data, which is collected for twenty-four hours of a corresponding day, from the meteorological administration server 30 at midnight (00:00) and may simulate the consumption power of the modeled facility by using the received prediction environment data.

Operation S33 of simulating the consumption power may include an operation where, by using a modeled facility and a space load (or an internal load), the control unit 120 calculates a relationship between at least one piece of prediction environment data of a control target region and the amount of power consumed by the modeled facility.

The control scenario may be a set of one or more control commands having an order so that a pleasant degree of the control target region is within a predetermined pleasant degree.

In operation S33 of simulating the consumption power, when simulating consumption power of the modeled facility, the energy use amount prediction module 1233 may simulate the modeled facility for each of a plurality of control target regions or with time.

That is, when a control target region is provided in plurality, the control unit 120 may calculate a relationship between the prediction environment data and the amount of the consumed power for each of the plurality of control target regions.

By calculating consumption power of facilities with time, the consumption power of the facilities may be predicted for a specific time.

Figure 12:
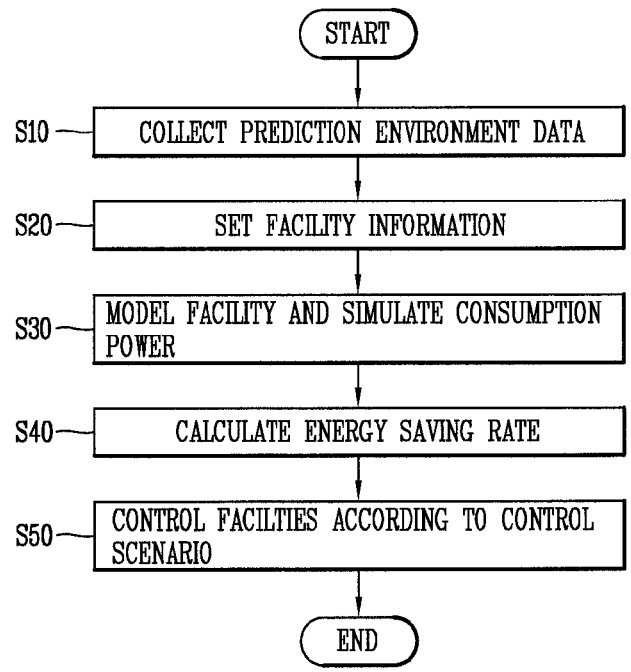
FIG. 12 is a flowchart illustrating a facility control method according to another exemplary embodiment.

FIG. 12 is a flowchart illustrating a facility control method according to another exemplary embodiment. Other embodiments and configurations may also be provided.

As illustrated in FIG. 12, the facility control method may further include operation S40 of calculating an energy saving rate of the modeled facility or the control target region, based on a simulation result of consumption power of the modeled facility that operates according to a combination of one or more control scenarios.

In operation S40 of calculating the energy saving rate of the control target region, the energy saving rate calculation module 124 that calculates the energy saving rate based on the simulation result of consumption power of the modeled facility, which operates according to the combination of the one or more control scenarios determined by the control unit 120, may calculate the energy saving rate of the modeled facility or the control target region.

The energy saving rate calculation module 124 may calculate the energy saving rate by using a rate of the amount of consumption power of the modeled facility, which operates according to the combination of the one or more control scenarios calculated by the energy use amount simulation module 123, based on a baseline.

In operation S40 of calculating the energy saving rate, the energy saving rate calculation module 124 may calculate a relationship between an energy saving rate (or the amount of consumption power) of facilities or equipment and the combination of the one or more control scenarios.

According to an exemplary embodiment, when a modeled facility or equipment operates according to a combination of one or more control scenarios applicable thereto, an energy saving rate may be calculated based on the amount of used energy which is calculated, and thus the energy saving rate (or the amount of consumption power) and a combination of one or more control scenarios corresponding thereto may be calculated.

As illustrated in FIG. 12, the facility control method according to an exemplary embodiment may further include operation S50 where, by using the energy saving rate calculation module 124, the control unit 120 determines a combination of one or more control scenarios according to an energy saving rate and may control facilities or equipment according to the determined combination of the one or more control scenarios.

Therefore, based on a predetermined energy saving rate or an energy saving rate input from a user, the control unit 120 may supply the user with a combination of one or more control scenarios corresponding to the energy saving rate by using a relationship between an energy saving rate (or the amount of consumption power) of facilities or equipment and a combination of one or more control scenarios calculated by the energy saving rate calculation module 124, and may also control driving of a corresponding facility or equipment according to the determined combination of the one or more control scenarios.

Therefore, a user may set a control scenario that is a control command for facilities or equipment to be controlled. However, although another user does not have sufficient knowledge of facilities or equipment or does not have knowledge of a control scenario, the other user may simply set only an energy saving rate, thereby controlling the facilities or the equipment according to a combination of one or more control scenarios based on the energy saving rate.

Figure 13:
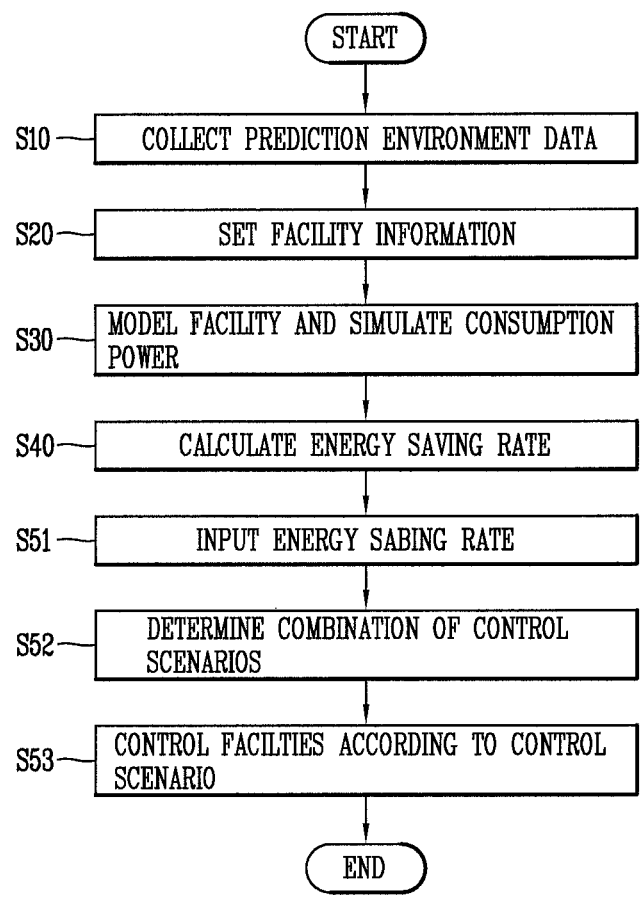
FIG. 13 is a flowchart illustrating a facility control method according to another exemplary embodiment.

FIG. 13 is a flowchart illustrating a facility control method according to another exemplary embodiment. Other embodiments and configurations may also be provided.

As illustrated in FIG. 13, the facility control method may include: operation S10 of collecting prediction environment data; operation S20 of setting information of facilities; operation S30 of simulating consumption power of a modeled facility; operation S40 of calculating an energy saving rate; and operation S51 of receiving a setting input for the energy saving rate from a user.

In operation S51 of receiving the setting input for the energy saving rate, the input unit 110 may receive a user input, which sets the energy saving rate, from the user.

As illustrated in FIG. 7A, the central control apparatus 100 may display, on a screen of the display unit 140, the scroll bar 60a for receiving a setting input for an energy saving rate. The user may set an energy saving rate by moving the scroll bar 60a displayed on the screen.

In this example, a range of the energy saving rate, which is received from the user through the scroll bar 60a, may be 0% to 100%. However, in other exemplary embodiments, the range of the energy saving rate may be a predetermined range of an energy saving rate.

Here, the predetermined range of the energy saving rate may be a range of a pleasant degree. That is, in a facility or equipment that performs an air conditioning operation on a control target region, when the user controls an energy saving rate of the facility or the equipment, the energy saving rate set by the scroll bar 60a may be limited not to deviate from a predetermined range of a pleasant degree for the control target region.

Therefore, when a user that does not have sufficient knowledge of facilities or equipment or does not have knowledge of a control scenario sets an energy saving rate, a range of the energy saving rate may be limited so that a person in a control target region does not feel displeasure.

However, when a predetermined range of an energy saving rate is a range of a pleasant degree, the predetermined range of the energy saving rate may change with the season, with time, according to an external air temperature or an internal air temperature, according to an external load or an internal load, and/or the like.

According to another exemplary embodiment, as illustrated in FIG. 7B, the central control apparatus 100 may display, on a screen of the display unit 140, the input window 60b for receiving a setting input for an energy saving rate. The input window 60b may be configured to directly receive a number from a user, or may be configured in order for numbers included in the input window 60b to increase or decrease at predetermined intervals according to an input that selects at least one (e.g. a ▲/▼ button) of buttons arranged on one side of the input window 60b.

According to another exemplary embodiment, the control unit 120 may display a time-based energy use rate as the graph 65 on a screen by using a simulation result of consumption power of a modeled facility that operates according to a combination of one or more control scenarios determined based on an input energy increase/decrease rate. In this example, as shown in FIGS. 7A and 7B, the setting input for the energy saving rate may be received based on a user input that upward and downward moves a time-based energy use rate graph referred to by reference numeral 65.

That is, when the user moves the graph 65 in an up and down direction through a drag and drop, a certain range of the energy saving rate may be set according to a position of the moved graph 65.

Subsequently, the facility control method according to another exemplary embodiment may include operation S52 of receiving the setting input for the energy saving rate from the user and determining a combination of one or more control scenarios based on the energy saving rate received from the user.

The control unit 120 (in more detail, the control scenario determination module 125) may determine the combination of the one or more control scenarios, based on the energy saving rate set by the user.

Subsequently, the facility control method may further include operation S53 of controlling the facilities according to the combination of the one or more control scenarios which is determined in operation S52 of receiving the setting input for the energy saving rate from the user and determining the combination of the one or more control scenarios.

The facility control method may further include an operation of displaying, on a screen of the display unit 140, the combination of the one or more control scenarios which is determined in operation S52 of determining the combination of the one or more control scenarios.

As illustrated in FIG. 7C, the display unit 140 may display the notification window 69a outputting a combination of one or more control scenarios which is determined by the control unit 120 (in more detail, the control scenario determination module 125), based on an energy saving rate input from a user.

The display unit 140 may display, on a screen, the combination of one or more control scenarios determined based on the energy saving rate input from the user to inform the user which control scenario a corresponding facility or equipment is driven according to.

Figure 14:
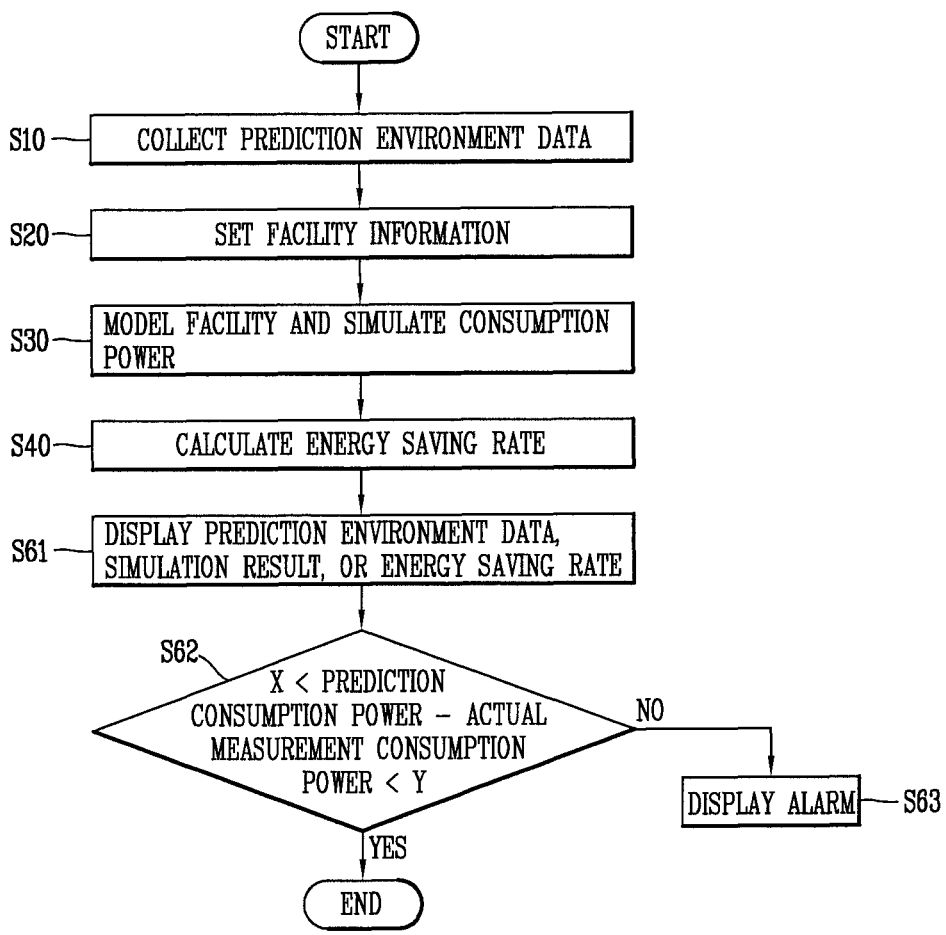
FIG. 14 is a flowchart illustrating a facility control method according to another exemplary embodiment.
Figure 15:
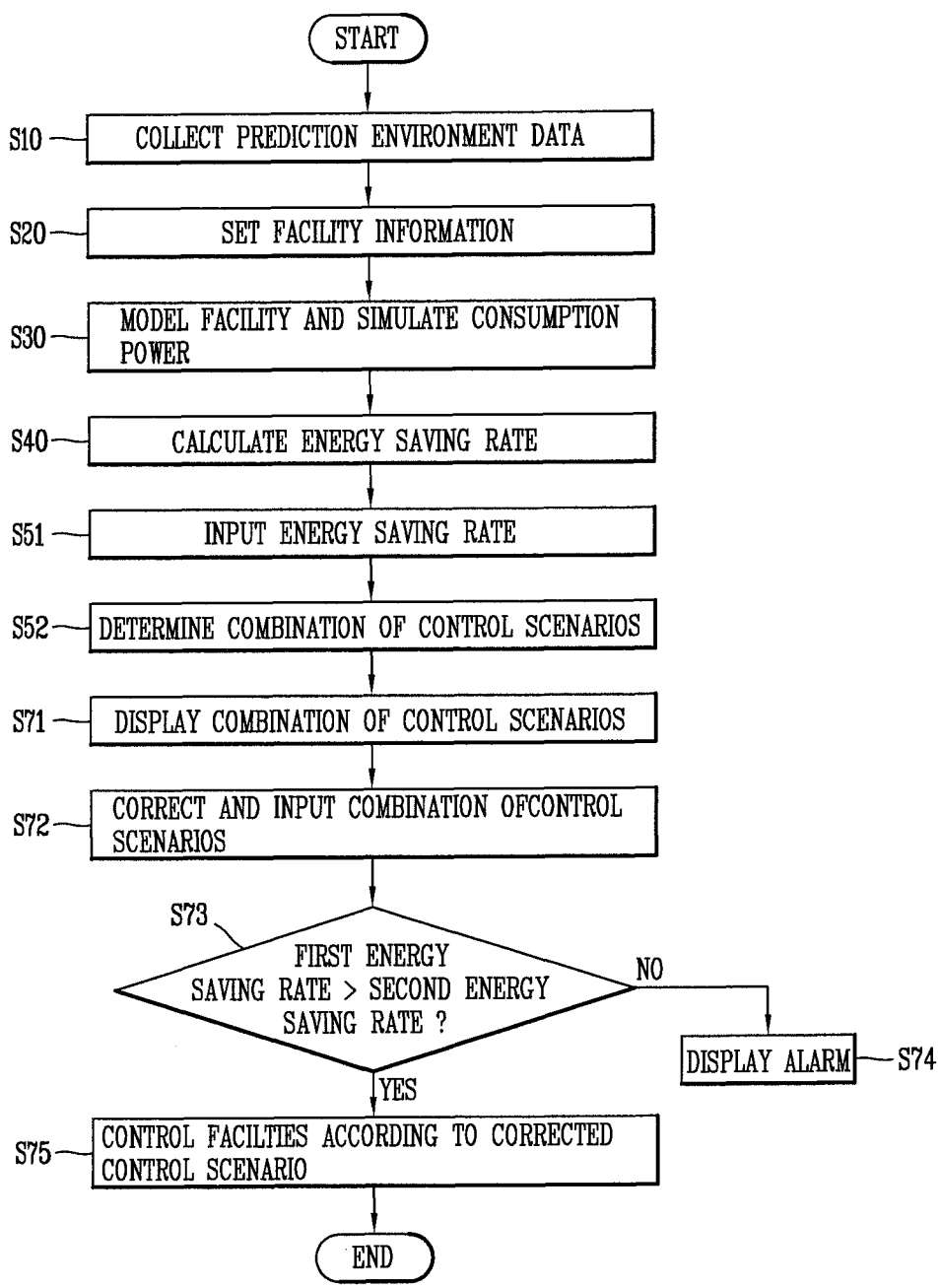
FIG. 15 is a flowchart illustrating a facility control method according to another exemplary embodiment.

As illustrated in FIG. 14, the facility control method may further include operation S61 of displaying, on the screen, a graphic object representing a simulation result of consumption power of the modeled facility, the prediction environment data, or the energy saving rate with time after operation S40 of calculating the energy saving rate.

The display unit 140 may display, as a time-based graph 63, at least one of pieces of prediction environment data (e.g. an external air temperature or humidity, an internal air temperature or humidity, and/or the like) which are received from the meteorological administration server 30 through a baseline 64 and the communication unit 150.

As described above, the control unit 120 may calculate a pleasant degree with time by using prediction environment data, which is received from the meteorological administration server 30 through the communication unit 150, based on a certain reference such as PMV, PPD, and/or the like, and may display the calculated pleasant degree as a graphic object on a screen of the display unit 140, based on a certain range of a pleasant degree.

For example, as illustrated in FIGS. 7A and 7B, the display unit 140 may display, on a screen, an external air temperature of a control target region, a baseline, and a prediction use amount representing a simulation result of consumption power of a modeled facility that operates according to a combination of one or more scenarios.

As illustrated in FIGS. 7A and 7B, the display unit 140 may display, on a screen, a graph including two regions (a P domain and an F domain) which are divided with respect to a current time.

That is, according to an exemplary embodiment, the display unit 140 may display, as a graph on a screen, at least one of a baseline, a prediction use amount representing a simulation result of consumption power of a modeled facility that operates according to a combination of one or more scenarios, and prediction environment data of the control target region, in a time domain (the F domain) subsequent to the current time. The control unit 120 may update and output the baseline, the prediction use amount, and state information in a time domain (the P domain) previous to the current timing as the current time elapses.

The prediction environment data, which is output in the time domain (the P domain) previous to the current time, may be displayed in the form of a graph obtained through update performed based on state information of facilities or equipment which is collected through a control point by the data collection module 121.

The control unit 120 (in more detail, the energy use amount simulation module 123) may simulate consumption power of a modeled facility by using environment data which is newly collected by the data collection module 121 at an arbitrary time or at every arbitrary period, and may update a graph showing an previously output prediction use amount in the time domain (the P domain) previous to the current time, thereby displaying the prediction use amount.

The control unit 120 may update and output a graph showing prediction environment data which is previously output in the time domain (the F domain) subsequent to the current time, based on prediction environment data (for example, an external air temperature or humidity, an internal air temperature or humidity, and/or the like) of a control target region which is newly received from the meteorological administration server 30 through the communication unit 150 in real time or at predetermined time intervals.

In a target facility of which the prediction use amount is simulated, the control unit 120 may receive an actually measured amount of power consumed by the facility through the data collection module 121 and a control point, and may display actual measurement consumption power amounts 66 and 67 as various forms of graphs on a screen.

For example, as illustrated in FIGS. 7A and 7B, the actual measurement consumption power amounts 66 and 67 of a target facility of which a prediction use amount is simulated at certain time intervals (e.g. at every one hour) may be displayed in the form of a rod graph on a screen.

However, when the user arbitrarily and forcibly drives facilities or equipment or at least one of the facilities, the equipment, the facility control apparatus, and the central control apparatus is broken down, the actual measurement consumption power amount 67 may exceed a prediction use amount representing showing a simulation result of consumption power of a modeled facility that operates according to a combination of one or more scenarios.

Therefore, the facility control method may further include operation S62 of determining whether a difference between the actual measurement consumption amount and the prediction use amount is out of a predetermined range and operation S63 of displaying alarm on the screen when the difference between the actual measurement consumption amount and the prediction use amount is out of the predetermined range.

As illustrated in FIG. 7D, when the difference between the actual measurement consumption power amount and the prediction use amount is out of the predetermined range, the control unit 120 may display the notification window 69b on a screen to issue a warning to the user.

The predetermined range may be arbitrarily set by the user, and may be equal to or broader than an error range between the actual measurement consumption power amount and the prediction use amount.

The facility control method may further include an operation of receiving, through the input unit 110, a selection input for at least one of a plurality of control target regions and an operation of displaying, on the screen, the prediction use amount or the energy saving rate of facilities included in the selected at least one control target region.

The facility control method may further include an operation of receiving, through the input unit 110, an input that selects at least one facility or equipment to be controlled from among a plurality of facilities or equipment and an operation of displaying, by the display unit 140, the prediction use amount or the energy saving rate of the selected at least one facility or equipment on the screen.

The user may select facilities or equipment included in each of a plurality of groups which each include a plurality of facilities or equipment for each of a plurality of control target regions or according to an arbitrary reference, and the display unit 140 may display, on a screen, a prediction use amount or an energy saving rate of facilities or equipment included in a selected control target region or a selected group.

Therefore, the control unit 120 may determine a combination of one or more scenarios for at least one facility or equipment included in a control target region or a group which is selected based on an energy saving rate input by the user, and may control the at least one facility or equipment according to the determined combination of the one or more scenarios.

Therefore, the user conveniently allows an energy saving operation to be performed for each control target region or each group.

The facility control method may further include operation S71 of displaying, on the screen of the display unit 140, the combination of the one or more control scenarios, which is determined in operation S52 of determining the control scenario, after operation S52 of determining the control scenario.

The facility control method may further include operation S72 of receiving a user input that corrects the determined combination of the one or more control scenarios.

As illustrated in FIG. 8A, the display unit 140 may display a combination of control scenarios, determined by the control scenario determination module 125, on the one region 71 of a displayed screen in a list form.

The display unit 140 may display, on the other one region 72 of the displayed screen, at least one control scenario applicable to facilities or equipment that perform an energy saving control operation.

That is, the control unit 120 (in more detail, the facility control logic module 1232) may select at least one applicable control scenario depending on the kinds of facilities or equipment that perform the energy saving control operation, and may display the selected at least one control scenario on a screen of the display unit 140.

A control scenario incapable of being applied to the facilities or the equipment is not displayed on a screen, thereby preventing the facilities or the equipment from being wrongly controlled by a user that does not have sufficient knowledge of the facilities or the equipment or does not have knowledge of a control scenario.

Therefore, the input unit 110 may receive a user input for correcting a combination of one or more control scenarios (hereinafter referred to as a first control scenario list) which is currently determined by the control scenario determination module 125. That is, one of one or more control scenarios (hereinafter referred to as a second control scenario list) applicable to facilities or equipment for performing the energy saving control operation may be added into the first control scenario list, or at least one control list may be removed from the first control scenario list.

The facility control method may further include: operation S73 of calculating, by the energy saving rate calculation module 124, a first energy saving rate according to a combination of control scenarios that have been corrected according to a user input, and comparing, by the control unit 120, the first energy saving rate with a second energy saving rate calculated based on a combination of one or more control scenarios which is determined by the control scenario determination module 125 before the first energy saving rate is corrected; and operation S74 of displaying alarm on the screen when the first energy saving rate is higher than the second energy saving rate.

As illustrated in FIG. 8B, when the first energy saving rate is higher than the second energy saving rate, the control unit 120 may display the notification window 79 on the screen to issue a warning to a user.

For example, when a combination of control scenarios corrected by the user is lower in energy saving rate than a combination of one or more control scenarios determined by the control scenario determination module 125, the control unit 120 may again check whether the user has an intention of correcting a combination of control scenarios, thereby preventing facilities or equipment from being wrongly controlled by a user that does not have sufficient knowledge of the facilities or the equipment or does not have knowledge of a control scenario.

The control unit 120 may set a certain range, and only when a difference between the first energy saving rate and the second energy saving rate is out of the set range, the control unit 120 may display the notification window 79 on the screen.

That is, this may be for allowing control suitable for the user's intention to be performed by preferentially taking into account the user's intention even when an energy saving rate is slightly lowered according to the corrected combination of the control scenarios.

According to an exemplary embodiment, at least one control target region may be selected from among a plurality of control target regions through the input unit 110, and the display unit 140 may display, on the screen, a facility group or a facility list included in the selected at least one control target region.

In this example, the display unit 140 may display the facility group, included in the selected at least one control target region, on the one region 75 of the screen, and when the input unit 110 receives, from the user, an input that selects one facility group from among a plurality of facility groups displayed on the screen, the display unit 140 may display, on one region 76 of the screen, a facility or equipment list corresponding to the selected facility group.

At least one control target facility or equipment may be selected from among a plurality of facilities (or equipment) through the input unit 110, and the display unit 140 may display, on the screen, at least one control scenario which is determined for the selected at least one facility or equipment.

For example, as illustrated in FIG. 8A, at least one control scenario, which is determined by the control scenario determination module 125 based on a set energy saving rate for the selected at least one facility or equipment, may be displayed on the one region 71 of the screen displayed by the display unit 140.

As described above, at least one control scenario list applicable to the selected at least one facility or equipment may be displayed on the screen.

According to another exemplary embodiment, at least one of a name, an ID, a kind, and an installation position that indicate facilities or equipment may be a factor, and the control unit 120 may display, on the screen, a list of facilities or equipment corresponding to the factor.

As illustrated in FIG. 8A, the input unit 110 may receive keywords from the user through the search window 77, and the control unit 120 may extract at least one factor from the received keywords. Therefore, the control unit 120 may display, on the screen, at least one facility or equipment list corresponding to the factor among a plurality of facility or equipment lists stored in the storage unit 130, based on the factor.

In order to select a control target region, a user may select one building from among a plurality of buildings and may select an arbitrary space or floor of the selected building by using at least one input button displayed on a screen.

For example, one or more buttons (e.g. the combo boxes 82 and 83) for selecting a control target region may be arranged in one region of a screen illustrated in FIG. 9A.

The user may select the first button 82 to select a building "gangseo building 2", and may select one button from among the plurality of second buttons 83 displayed based on the selected building to select a control target region.

As described above, at least one facility or equipment may be selected with a control target region as one unit, or one facility or equipment may be selected from among a plurality of facilities or equipment located in a selected space or on a selected floor. That is, the user may select a second-floor air conditioning load zone to select one facility from among a plurality of facilities located therein.

As illustrated in FIG. 9B, the display unit 140 may display a graphic object, representing facilities such as the illumination 88, the indoor unit 87, and/or the like on a drawing which shows an arbitrary space or floor selected by a user, on a partial region of a screen in the form of a popup window.

Therefore, the user may select at least one graphic object representing facilities or equipment, the control unit 120 may determine a combination of one or more control scenarios for at least one facility or equipment selected by the user, and the display unit 120 may display, on a screen, the combination of the one or more control scenarios determined by the control unit 120.

As described above, the display unit 140 may display a graphic object, representing facilities or equipment, on a drawing which represents a control target region, and thus the user easily identifies which position facilities or equipment to be controlled are located. A problem may be solved where facilities or equipment undesired by the user are controlled.

The display unit 140 may provide a drawing of a building in order for the user to select an arbitrary space or floor or may provide a map, on which positions of buildings are marked, in order for the user to select a specific building.

Therefore, according to an exemplary embodiment, FIGS. 8A and 8B, which are exemplary diagrams of a screen displayed for outputting and correcting a combination of one or more control scenarios which is determined for facilities or equipment by the control scenario determination module 125, may be displayed on one region of a screen referred to by reference numeral 81 of FIGS. 9A and 9B.

As illustrated in FIGS. 9A and 9B, the display unit 140 may display, on one region 86 of a screen, graphs showing one or more of a baseline, a prediction use amount, and prediction environment data of a control target region for each of a plurality of control target regions or each of a plurality of groups which each include a plurality of facilities or equipment for each control target region or according to the arbitrary reference. The displayed graphs may be located at adjacent positions, and thus a user can immediately recognize a state of each control target region or a state of each group desired by the user.

The facility control method may further include operation S52 of determining the combination of the one or more control scenarios based on the energy saving rate received from the user and operation S75 of controlling the facilities according to the corrected combination of the one or more control scenarios when the determined combination of the one or more control scenarios is corrected in operation S72.

Embodiments of the present disclosure may be implemented in a form of executable program command through a variety of computer means recordable to computer readable media. The computer readable media may include solely or in combination, program commands, data files and data structures. The program commands recorded to the media may be components specially designed for the present disclosure or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

Therefore, an aspect of the detailed description is to provide a central control apparatus for controlling facilities, a facility control system including the same, and a method of controlling facilities, which simulate consumption power of facilities.

To achieve these and other advantages and in accordance with the purpose of this specification, as embodied and broadly described herein, a central control apparatus includes: a control unit performing control on facilities or equipment, wherein the control unit includes: a data collection module configured to collect prediction environment data including weather information of a control target region; a system setting module configured to set information of at least one facility in the control target region; and an energy use amount simulation module configured to model the at least one facility, based on the information of the at least one facility, set at least one control scenario applicable to the at least one facility, and simulate consumption power of the modeled at least one facility that operates according to the at least one control scenario.

In the modeled at least one facility, an input variable may be one of a kind of the at least one facility, a capacity of the at least one facility, a connection relationship with other facilities, and a driving condition of the at least one facility, and an output variable may be consumption power of the at least one facility.

By using the modeled at least one facility and a space load, the control unit may calculate a relationship between at least one piece of prediction environment data of the control target region and an amount of power consumed by the modeled at least one facility.

The prediction environment data may include at least one of a temperature and humidity of the control target region, and the space load may be calculated based on the prediction environment data of the control target region.

When the control target region is provided in plurality, the control unit may calculate a relationship between the prediction environment data and the amount of the consumed power.

The control scenario may be a set of one or more control commands having an order so that a pleasant degree of the control target region is within a predetermined pleasant degree, and the control scenario may include at least one of an optimal turn-on or off control operation of saving energy by operating the at least one facility before a predetermined driving time of the at least one facility, based on a setting temperature of the control target region and a current temperature of the control target region, a setting temperature control operation of changing a setting temperature according to a space load of the control target region, and a duty control operation of controlling a turn-on or off period of the at least one facility.

The energy use amount prediction module may simulate the modeled at least one facility for each of a plurality of control target regions or with time.

The control unit may further include an energy saving rate calculation module configured to calculate an energy saving rate of the at least one facility or the control target region, based on a simulation result of consumption power of the modeled at least one facility which operates according to a combination of one or more control scenarios, and the control unit may control the at least one facility according to the combination of the one or more control scenarios determined based on the energy saving rate.

The central control apparatus may further include a communication unit configured to communicate with a meteorological administration server, wherein the data collection module may collect the prediction environment data, including the weather information of the control target region, from the meteorological administration server through the communication unit.

In another aspect of the present disclosure, a facility control system includes: at least one facility or equipment; and a central control apparatus configured to perform control on the at least one facility or equipment, wherein the central control apparatus collects prediction environment data including weather information of a control target region, sets information of at least one facility in the control target region, and models the at least one facility, based on the information of the at least one facility, set at least one control scenario applicable to the at least one facility, and simulate consumption power of the modeled at least one facility that operates according to the at least one control scenario.

By using the modeled at least one facility and a space load, the central control apparatus may calculate a relationship between at least one piece of prediction environment data of the control target region and an amount of power consumed by the modeled at least one facility, and when the control target region is provided in plurality, the central control apparatus may calculate a relationship between the prediction environment data and the amount of the consumed power.

The prediction environment data may include at least one of a temperature and humidity of the control target region, and the space load may be calculated based on the prediction environment data of the control target region.

The control scenario may be a set of one or more control commands having an order so that a pleasant degree of the control target region is within a predetermined pleasant degree, and the control scenario may include at least one of an optimal turn-on or off control operation of saving energy by operating the at least one facility before a predetermined driving time of the at least one facility, based on a setting temperature of the control target region and a current temperature of the control target region, a setting temperature control operation of changing a setting temperature according to a space load of the control target region, and a duty control operation of controlling a turn-on or off period of the at least one facility.

The central control apparatus may calculate an energy saving rate of the at least one facility or the control target region, based on a simulation result of consumption power of the modeled at least one facility which operates according to a combination of one or more control scenarios and control the at least one facility according to the combination of the one or more control scenarios determined based on the energy saving rate.

The central control apparatus may collect the prediction environment data, including the weather information of the control target region, from the meteorological administration server through the communication unit in communication with a meteorological administration server.

In another aspect of the present disclosure, a facility control method includes: collecting prediction environment data including weather information of a control target region; setting information of at least one facility in the control target region; and modeling the at least one facility, based on the information of the at least one facility and simulating consumption power of the modeled at least one facility that operates according to a control scenario, wherein the simulating of the consumption power includes: modelling the at least one facility, based on the information of the at least one facility; setting at least one control scenario applicable to the at least one facility; and simulating consumption power of the modeled at least one facility that operates according to the set at least one control scenario, and the control scenario is a set of one or more control commands having an order so that a pleasant degree of the control target region is within a predetermined pleasant degree.

The modelling of the at least one facility may include calculating a relationship between at least one piece of prediction environment data of the control target region and an amount of power consumed by the modeled at least one facility by using the modeled at least one facility and a space load.

The simulating of the consumption power may include simulating the modeled at least one facility for each of a plurality of control target regions or with time.

The facility control method may further include: calculating an energy saving rate of the at least one facility or the control target region, based on a simulation result of consumption power of the modeled at least one facility which operates according to a combination of one or more control scenarios; determining a combination of one or more control scenarios based on the energy saving rate; and controlling the at least one facility according to the determined combination of the one or more control scenarios.

The collecting of the prediction environment data may include collecting the prediction environment data, including the weather information of the control target region, from a meteorological administration server.

The central control apparatus, the facility control system including the same, and the facility control method may simulate consumption power of facilities or equipment to be controlled.

An energy saving rate of facilities or a control target region may be calculated based on a simulation result based on a combination of one or more control scenarios.

Therefore, driving of facilities or equipment may be controlled according to an energy saving rate desired by a user.

When a facility or equipment is a means that performs an air conditioning operation on a control target region, a pleasant degree of the control target region is maintained, and an energy saving control operation may be performed for maintaining a high energy saving rate for the facility or the equipment.

A user may correct an obtained control scenario for facilities or equipment to be suitable for the user's intention, and driving of the facilities or the equipment may be controlled according to the corrected control scenario.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A central control apparatus comprising:
   a display device to display information;
   a communication device to communicate with an external device;
   a control device to perform control of facilities or equipment, wherein the control device includes:
      a data collection module configured to obtain prediction environment data of a control target region, the prediction environment data including weather information of the control target region;
      a system setting module configured to set information of at least one facility in the control target region; and
      an energy use amount simulation module configured to model the at least one facility, based on the set information of the at least one facility, the energy use amount simulation module to set at least one control scenario for the at least one facility, and the energy use amount simulation module to simulate consumption power of the modeled at least one facility that operates based on the at least one control scenario,
   wherein by using the modeled at least one facility and a space load, the control device determines a relationship between at least one portion of prediction environment data of the control target region and an amount of power consumed by the modeled at least one facility, and
   wherein the control device calculates the space load based on a thermal equilibrium equation established by using a first heat amount based on a temperature change rate in the control target region and a second heat amount based on a change amount of heat that is input to the control target region or output from the control target region.

2. The central control apparatus of claim 1, wherein at the modeled at least one facility, an input variable is one of a kind of the at least one facility, a capacity of the at least one facility, a connection relationship with other facilities, and a driving condition of the at least one facility, and an output variable is consumption power of the at least one facility.

3. The central control apparatus of claim 1, wherein
   the prediction environment data includes at least one of a temperature of the control target region and humidity of the control target region, and
   the space load is determined based on the prediction environment data of the control target region.

4. The central control apparatus of claim 1, wherein when the control target region is provided in plurality, the control device determines a relationship between the prediction environment data and the amount of the consumed power.

5. The central control apparatus of claim 1, wherein
the control scenario is a set of one or more control commands provided in a specific order such that a pleasant degree of the control target region is within a predetermined pleasant degree, and
the control scenario includes at least one of an optimal turn-on or turn-off control operation, a setting temperature control operation and a duty control operation,
the optimal turn-on or turn-off control operation for saving energy by operating the at least one facility before a predetermined driving time of the at least one facility, based on a setting temperature of the control target region and a current temperature of the control target region, the setting temperature control operation for changing a setting temperature according to a space load of the control target region, and the duty control operation for controlling a turn-on or turn-off period of the at least one facility.

6. The central control apparatus of claim 1, wherein the energy use amount simulation module simulates the modeled at least one facility for each of a plurality of control target regions or simulates the modeled at least one facility based on time.

7. The central control apparatus of claim 1, wherein the control device includes:
an energy saving rate calculation module configured to determine an energy saving rate of the at least one facility or the control target region, based on a simulation result of consumption power of the modeled at least one facility that operates according to a combination of one or more control scenarios, and
the control device controls the at least one facility based on the combination of the one or more control scenarios determined based on the energy saving rate.

8. The central control apparatus of claim 1, wherein the communication device is configured to communicate with a meteorological administration server,
wherein the data collection module obtains the prediction environment data, including the weather information of the control target region, from the meteorological administration server through the communication device.

9. A facility control system comprising:
at least one facility or equipment; and
a central control apparatus configured to perform control of the at least one facility or equipment,
wherein the central control apparatus obtains prediction environment data of a control target region, the prediction environment data includes weather information of the control target region, the central control apparatus sets information of at least one facility in the control target region, and models the at least one facility, based on the set information of the at least one facility,
wherein the central control apparatus sets at least one control scenario for the at least one facility, and simulates consumption power of the modeled at least one facility that operates based on the at least one control scenario,
wherein by using the modeled at least one facility and a space load, the central control apparatus determines a relationship between at least one portion of the prediction environment data of the control target region and an amount of power consumed by the modeled at least one facility, and
when the control target region is provided in plurality, the central control apparatus determines a relationship between the prediction environment data and the amount of the consumed power,
wherein the central control apparatus calculates the space load based on a thermal equilibrium equation established by using a first heat amount based on a temperature change rate in the control target region and a second heat amount based on a change amount of heat that is input to the control target region or output from the control target region.

10. The facility control system of claim 9, wherein
the prediction environment data includes at least one of a temperature of the control target region and humidity of the control target region, and
the space load is determined based on the prediction environment data of the control target region.

11. The facility control system of claim 9, wherein
the control scenario is a set of one or more control commands provided in a specific order such that a pleasant degree of the control target region is within a predetermined pleasant degree, and
the control scenario includes at least one of an optimal turn-on or turn-off control operation, a setting temperature control operation and a duty control operation,
the optimal turn-on or turn-off control operation for saving energy by operating the at least one facility before a predetermined driving time of the at least one facility, based on a setting temperature of the control target region and a current temperature of the control target region, the setting temperature control operation for changing a setting temperature according to a space load of the control target region, and the duty control operation for controlling a turn-on or turn-off period of the at least one facility.

12. The facility control system of claim 9, wherein the central control apparatus determines an energy saving rate of the at least one facility or the control target region, based on a simulation result of consumption power of the modeled at least one facility that operates according to a combination of one or more control scenarios, and controls the at least one facility based on the combination of the one or more control scenarios determined based on the energy saving rate.

13. The facility control system of claim 9, wherein the central control apparatus obtains the prediction environment data, including the weather information of the control target region, from a meteorological administration server through a communication device in communication with the meteorological administration server.

14. A facility control method comprising:
obtaining prediction environment data of a control target region of the prediction environment data including weather information of a control target region;
setting information of at least one facility in the control target region; and
modeling the at least one facility based on the set information of the at least one facility and simulating consumption power of the modeled at least one facility that operates based on a control scenario, wherein the simulating of the consumption power includes:
modelling the at least one facility based on the set information of the at least one facility,
setting at least one control scenario for the at least one facility, and
simulating consumption power of the modeled at least one facility that operates based on the set at least one control scenario, wherein the control scenario is a set of one or more control commands provided in a specific order such that a pleasant degree of the control target region is within a predetermined pleasant degree, wherein the modelling of the at least one facility includes determining a relationship between at least one portion of the prediction environment data of the control target region and an amount of power consumed by the modeled at least one facility by using the modeled at least one facility and a space load, wherein the space load is calculated based on a thermal equilibrium equation established by using a first heat amount based on a temperature change rate in the control target region and a second heat amount based on a change amount of heat that is input to the control target region or output from the control target region.

15. The facility control method of claim 14, wherein the simulating of the consumption power includes simulating the modeled at least one facility for each of a plurality of control target regions or simulating the modeled at least one facility based on time.

16. The facility control method of claim 14, further comprising:

determining an energy saving rate of the at least one facility or the control target region, based on a simulation result of consumption power of the modeled at least one facility that operates according to a combination of one or more control scenarios;

determining a combination of one or more control scenarios based on the energy saving rate; and controlling the at least one facility based on the determined combination of the one or more control scenarios.

17. The facility control method of claim 14, wherein the obtaining of the prediction environment data includes obtaining the prediction environment data, including the weather information of the control target region, from a meteorological administration server.

* * * * *